US012717796B1

(12) United States Patent
Nguyen et al.

(10) Patent No.: US 12,717,796 B1
(45) Date of Patent: Aug. 25, 2026

(54) DETERMINING SEMANTIC MEANING OF CONVERSATIONS TO ENHANCE CHATBOT INTERACTIONS

(71) Applicant: Olive Independent Study, Inc., Atlanta, GA (US)

(72) Inventors: Bill Nguyen, Truckee, CA (US); Jacob Justice, Atlanta, GA (US); Drake Kelly, Atlanta, GA (US); Ella McChesney, Atlanta, GA (US); Abhinav Vemulapalli, Atlanta, GA (US); Ian Boraks, Atlanta, GA (US)

(73) Assignee: Olive Independent Study, Inc., Atlanta, GA (US)

( * ) Notice: Subject to any disclaimer, the term of this patent is extended or adjusted under 35 U.S.C. 154(b) by 0 days.

(21) Appl. No.: 19/243,582

(22) Filed: Jun. 19, 2025

Related U.S. Application Data

(60) Provisional application No. 63/780,806, filed on Mar. 31, 2025.

(51) Int. Cl.
*G06F 16/2457* (2019.01)
*G06F 16/242* (2019.01)

(52) U.S. Cl.
CPC ...... *G06F 16/24575* (2019.01); *G06F 16/243* (2019.01)

(58) Field of Classification Search
CPC ......................... G06F 16/24575; G06F 16/243
See application file for complete search history.

(56) References Cited

U.S. PATENT DOCUMENTS

2024/0412720 A1* 12/2024 Vasylyev .......... G06F 16/90332
2025/0265757 A1* 8/2025 German .................. G06F 40/56

* cited by examiner

*Primary Examiner* — Aleksandr Kerzhner
*Assistant Examiner* — Aryan D Toughiry
(74) *Attorney, Agent, or Firm* — Schwegman Lundberg & Woessner, P.A.

(57) ABSTRACT

A system and method for enhancing chatbot interactions by determining the semantic meaning of conversations are disclosed. This approach addresses limitations in current large language models (LLMs) by integrating a smaller companion model, "Intuition," trained on voice data with timestamps, emotional tags, and speaker metadata. This system processes audio inputs to generate a structured Semantic Markup Language (SML) output, which includes semantic tags for emotional states, user intent, and contextual references. The SML output is used to create optimized prompts for LLMs, enabling more natural and contextually aware AI interactions. The system dynamically adapts to user-specific contexts and emotional states, improving the relevance and personalization of AI-generated responses. Applications include customer service, education, and healthcare, where voice-first, empathetic AI assistance is beneficial. The system's architecture supports real-time adaptability and continuous learning, enhancing user experience by reducing the need for prompt engineering.

17 Claims, 20 Drawing Sheets

EXTRACTING SEMANTIC CUES FROM AUDIO:

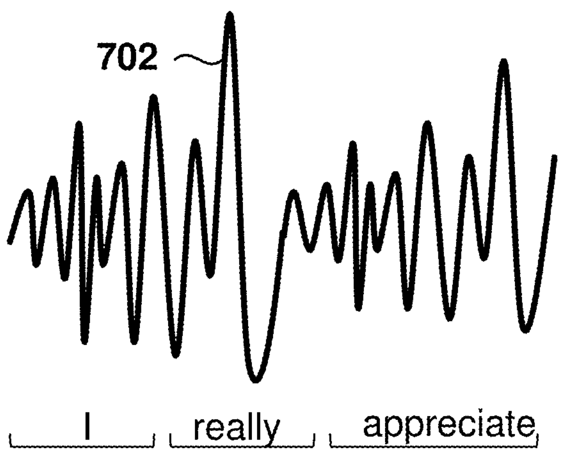

HIGH-RESOLUTION AUDIO CAPTURE & TIMESTAMPING

FINE-GRAINED SEGMENTATION:

THE SYSTEM CAPTURES RAW AUDIO FROM LIVE CONVERSATIONS AND SEGMENTS IT AT THE MILLISECOND LEVEL. EACH WORD-OR EVEN INDIVIDUAL PHONEMES-IS TIMESTAMPED PRECISELY.
THIS LEVEL OF GRANULARITY ENABLES THE SYSTEM TO MAP SUBTLE CHANGES IN SPEECH (SUCH AS PAUSES, STRESS PATTERNS, AND RAPID FLUCTUATIONS) TO

SPECIFIC MOMENTS IN THE CONVERSATION.

FIG. 7

PHONEME LEVEL ANALYSIS & PROSODY EXTRACTION

SIGNAL PROCESSING FOR ACOUSTIC FEATURES:

BEYOND BASIC SPEECH-TO-TEXT CONVERSION, THE SYSTEM ANALYZES THE UNDERLYING AUDIO WAVEFORM TO EXTRACT PHONETIC DETAILS-PITCH, VOLUME, DURATION, AND INTONATION CONTOURS. THESE FEATURES FORM THE BUILDING BLOCKS OF PROSODY (THE RHYTHM AND SOUND PATTERNS OF SPEECH).

LINGUISTIC MARKER IDENTIFICATION:

USING SPECIALIZED NATURAL LANGUAGE PROCESSING ALGORITHMS ENHANCED WITH AUDIO DERIVED METADATA, THE SYSTEM TAGS SEGMENTS WITH SEMANTIC MARKERS. FOR INSTANCE, A RISING INTONATION COMBINED WITH A QUICK PACE MIGHT BE LABELED AS A <QUESTION> OR <CURIOSITY> MARKER, WHILE A FLAT, MONOTONE DELIVERY MIGHT BE TAGGED WITH <DISAPPOINTMENT> OR <SARCASM>.

EXAMPLE:

IN A CONVERSATION, IF A SPEAKER SAYS, “OH, GREAT...” WITH A FLAT TONE AND A SLIGHT DROP IN PITCH, THE SYSTEM USES BOTH THE TIME STAMPS AND PROSODIC ANALYSIS TO ATTACH A TAG SUCH AS <SARCASM>. THIS TAG, UNAVAILABLE IN PLAIN TEXT, PROVIDES RICHER SEMANTIC CONTEXT.

FIG. 8

INTEGRATED SENTIMENT ANALYSIS

MULTIMODAL SENTIMENT EVALUATION:

THE SYSTEM COMBINES TEXT-BASED SENTIMENT ANALYSIS WITH AUDIO FEATURES. IT ASSESSES VOCAL STRESS, CHANGES IN PITCH, AND RHYTHM TO GAUGE EMOTIONAL TONE. THIS DUAL ANALYSIS PROVIDES A MULTIDIMENSIONAL SENTIMENT PROFILE FOR EVERY SEGMENT.

EXAMPLE:

A USER MIGHT SAY, “I’M FINE” IN A NORMALLY POSITIVE CONTEXT, BUT IF THE AUDIO ANALYSIS SHOWS A DOWNWARD PITCH AND SLOWER SPEECH RATE, THE SYSTEM MIGHT TAG THE UTTERANCE WITH <UNDERSTATED DISTRESS>. SUCH A NUANCED SENTIMENT CUE ENSURES THAT EMOTIONAL CONTEXT ISN’T LOST WHEN THE DATA IS CONVERTED INTO TEXT.

FIG. 9

Enhancing AI Responses with a Companion Module

Parallel Real-Time Processing

Dual System Architecture:

A dedicated companion module operates in parallel with the main language model. While the main model processes the general conversation (using traditional language model techniques), the companion module continuously ingests the semantic cues extracted from the audio.

Real-Time Monitoring:

This module monitors shifts in sentiment, pauses, and linguistic markers, dynamically generating “hints” or supplementary context in real time. These hints are designed to alert the main AI to nuances that pure text might miss.

Dynamic Prompt Adjustments via Reinforcement Learning

Contextual Hint Generation:

When the companion module detects specific cues, such as a sarcastic tone, abrupt pause, or heightened emotion, it formulates additional instructions that are merged into the prompt for the main AI. For example, if a user’s tone suggests frustration, the module might add a hint like:

*"User exhibits signs of frustration; consider a clarifying or empathetic follow-up.”*

Reinforcement and Feedback Loop:

The system continuously compares the main AI’s responses against real-time user feedback. If the user’s subsequent reply indicates that the response was off-target (e.g., continued frustration or a corrective remark), the companion module re-evaluates and adjusts future prompts. This creates a dynamic, real-time fine-tuning loop where the model “learns” the conversational context on the fly

FIG. 10

SOFTWARE ARCHITECTURE

FIG. 16
#3 PARALINGUISTIC SIGNALS
USER
1402
Audio file: soft, nervous laugh "we could try writing the story that way."
LLM
1404
Response: "Perfect!" Provides a [wall of text] where the user does not feel the response is not ideal and terminates the chat.
INTUITION API
1406
"hint": "The user's brief, hesitant laugh suggests nervousness or uncertainty. Acknowledge their discomfort and respond supportively—encourage them to elaborate or reassure them that their idea is welcome."

DETERMINING SEMANTIC MEANING OF CONVERSATIONS TO ENHANCE CHATBOT INTERACTIONS

CROSS-REFERENCE TO RELATED APPLICATIONS

This application claims the benefit of U.S. Provisional Patent No. 63/780,806, filed Mar. 31, 2025, and entitled "Determining Semantic Meaning of Conversations to Enhance Chatbot Interactions." This provisional application is herein incorporated by reference in its entirety.

TECHNICAL FIELD

The subject matter disclosed herein generally relates to methods, systems, and machine-readable storage media for improving interactions with automated conversational systems.

BACKGROUND

Large Language Models (LLMs) have some limitations when interacting with people. These models, while capable of processing vast amounts of text data, struggle to engage in human-like conversations. The issue is particularly evident in their inability to respond to conversational nuances such as intonation, pauses, and turn-taking, which are critical elements of human speech.

Some of the limitations of existing systems include:

Linear, turn-by-turn processing. Conventional mechanisms process user inputs on a turn-by-turn basis, lacking a robust sense of elapsed time or multi-turn memory that adequately captures speaker intent evolution.

Limited emotional and intent tracking. While some models can detect basic sentiment, existing solutions rarely integrate advanced affective markers (e.g., frustration, urgency) or nuanced speaker intent tags into the conversation flow.

Inadequate Contextual Anchoring. References to "yesterday," "earlier," or "the example above" are typically anchored solely by text tokens. Systems frequently misinterpret these references, especially when the user returns after hours or days, due to an inability to handle timestamp-based context.

Lack of conversational strategy. Pragmatic and metacognitive elements, e.g., politeness strategies, clarifying questions, or reflections, are not systematically integrated. Dialogues often remain superficial and do not adapt based on ongoing user feedback.

Task comprehension gaps. Large Language Models often overlook nuanced cues or high-level task objectives (e.g., error analysis, domain-specific goals) unless repeatedly reminded within each prompt. This reduces their efficacy in specialized or time-spanning interactions.

Specific symptoms of this problem include the tendency of models to provide comprehensive but non-contextual responses, often requiring users to engage in prompt engineering to elicit the desired output. This can be frustrating for novice users who are unfamiliar with the intricacies of interacting with such models. An example of this issue is when a user requests a 45-minute lesson in French, and the model prematurely concludes the interaction, lacking the concept of time and context.

The problem often occurs within the environment of conversational AI systems, where the models are trained predominantly on text data from the internet. This training method does not equip the models with the ability to process audio cues or adapt to the dynamic nature of human conversations. The lack of real-time adaptability and context understanding is a significant limitation.

The impact of this problem is substantial, affecting the user experience by making interactions with AI models less intuitive and more cumbersome. Users may become frustrated with the need for precise prompts and the models' inability to engage in natural, flowing conversations. If unaddressed, this problem could hinder the adoption and effectiveness of AI in conversational applications.

To address these deficiencies, the solutions contemplate two-model or multi-agent ecosystems. In such configurations, a smaller, specialized companion model, trained on conversational data (with timestamps, emotional tags, speaker metadata, and multi-turn structures), can provide a semantic or contextual overlay to guide the primary LLM's generation process.

This smaller model, referred to herein as "Intuition," can track elapsed time and conversation state across user sessions, continuously refine speaker intent and emotional states, dynamically produce structured markup that captures these insights, and generate or enrich the final prompt that the primary LLM receives.

BRIEF DESCRIPTION OF THE DRAWINGS

Various appended drawings illustrate examples of the present disclosure and cannot be considered limiting its scope.

FIG. 7 shows a system for extracting semantic cues from audio, focusing on high-resolution audio capture and time-stamping, according to some examples.

FIG. 8 shows a system for phoneme-level analysis and prosody extraction, which plays a significant role in understanding the nuances of spoken language beyond mere text transcription, according to some examples.

FIG. 9 shows an integrated sentiment analysis system that combines text-based sentiment analysis with audio features to provide a comprehensive evaluation of emotional tone, according to some examples.

FIG. 10 shows the design of SMLTalk to enhance AI responses through the integration of a companion module, which operates in parallel with the primary language model, according to some examples.

DETAILED DESCRIPTION

Figure 1:
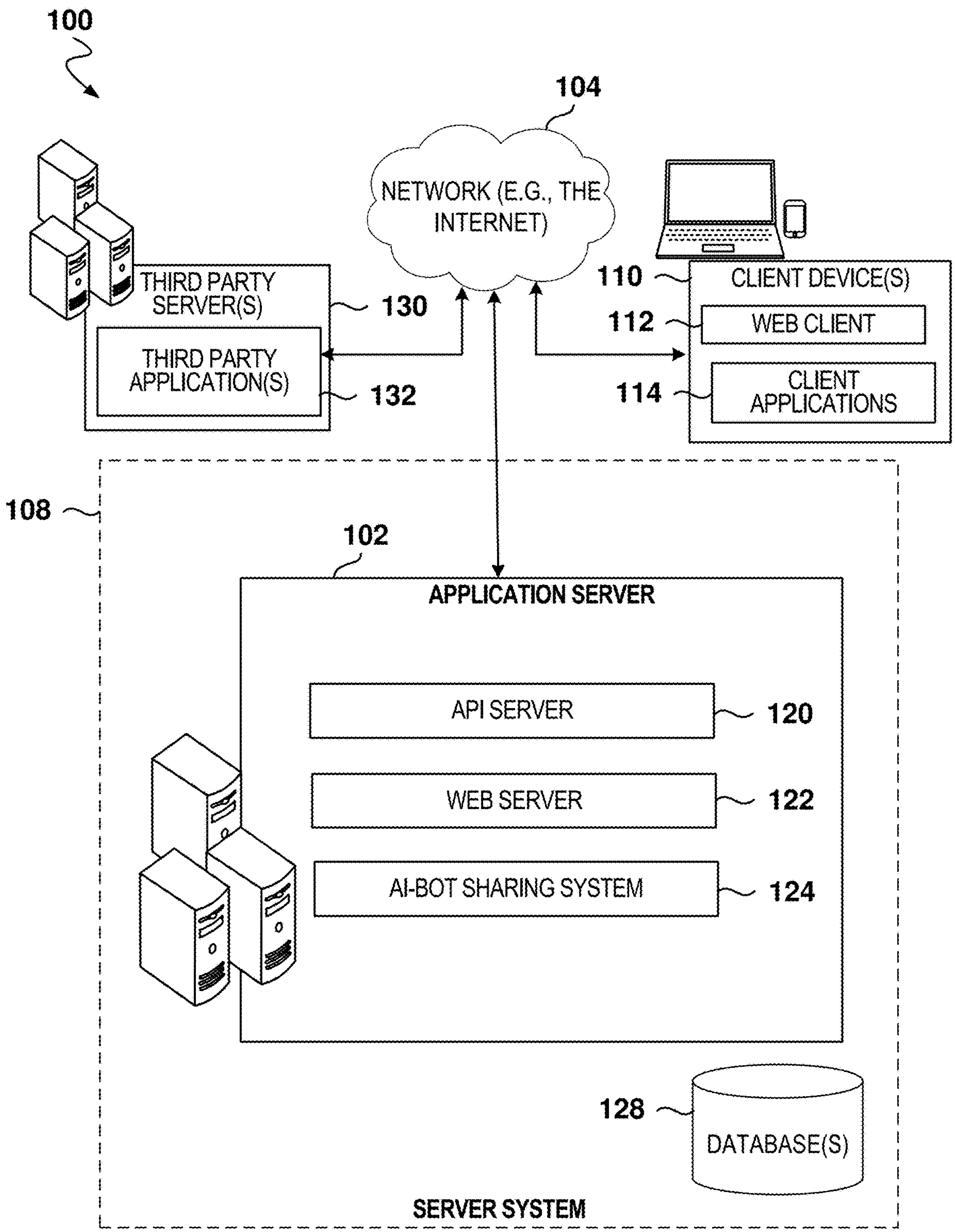
FIG. 1 is a block diagram illustrating a networked system for an AI chatbot system, according to some examples.

Example methods, systems, and computer programs described herein are directed at determining the semantic meaning of conversations to enhance chatbot interactions. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

The solution presented details on how to enhance the conversational capabilities of Large Language Models (LLMs) by training them on voice data rather than text alone. This approach aims to address the limitations of current models in understanding and responding to human-like conversational dynamics. The solution involves several components and methodologies that work together to improve the model's performance in real-time interactions.

A system referred to as SMLTalk is presented. In some examples, SMLTalk transforms voice conversations into a semantic markup language for enhanced interaction with large language models. The solutions presented relate to the field of conversational artificial intelligence (AI) and natural language processing (NLP). More specifically, it pertains to systems and methods that transform audio inputs from voice conversations into structured Semantic Markup Language (SML). The solution leverages this structured output, along with an optional smaller companion model (sometimes referred to as an "Intuition" module), to generate optimized and contextually personalized prompts for use by Large Language Models (LLMs), enabling enhanced and more relevant AI-driven interactions The solution includes the analysis of audio data, where sound waves are timestamped and diarized to differentiate between speakers. Each segment of speech is time-stamped, providing the model with enriched data that includes intonation, sentiment, and semantics. The model is designed to recognize conversational cues, such as when a speaker is venting, in order to respond with empathy.

The training process involves fine-tuning the model with real-time feedback, allowing it to adapt to individual users' conversational styles. This approach is based on the principle that human communication is learned through speech, not text, enabling the model to mimic human conversational patterns better.

The solution addresses technical challenges by providing real-time adaptability and context understanding, which are lacking in text-based models. It targets the issue of non-contextual responses by enhancing the model's ability to process audio cues. The outcomes include more intuitive and natural interactions with AI models, reducing the need for prompt engineering and improving the overall user experience.

One benefit of the solution is its ability to reduce errors and improve user satisfaction in conversational applications.

The proposed solution is a system for enhancing AI language models to produce more human-like conversational responses. This system operates in parallel with existing large language models (LLMs) like OpenAI's ChatGPT, providing additional context and guidance to improve the quality and naturalness of AI-generated responses.

The solution involves several components and processes. First, it utilizes a specialized model trained exclusively on voice conversations rather than text data. This model analyzes not just the words spoken but also prosodic elements such as intonation, pauses, and turn-taking behaviors. The system processes audio input by analyzing sound waves, timestamping speech segments, and diarizing speakers.

In one aspect, the preprocessing involves adding semantic markup to the conversation text. This markup includes tags for elements like sarcasm, humor, and frustration. The system also creates a "conversational string" that captures the flow of ideas across multiple turns in a dialogue.

The core of the solution is an LLM, described as a "small language model" or Intuition model, which generates hints or guidance for the primary AI model (e.g., ChatGPT) in real-time as a conversation progresses. These hints are designed to help the primary model better understand user intent and context, leading to more appropriate and natural responses.

A unique feature of this solution is its use of "test time compute" or real-time fine-tuning. As the conversation unfolds, the system's model adapts and optimizes itself based on the actual dialogue. It can predict potential future turns in the conversation and adjust its understanding as the interaction progresses.

The implementation of this solution involves several technical operations. The system first ingests audio input, which is then processed through multiple filters to extract various types of information. This may include using tools like Spacy for natural language processing tasks. The extracted information is used to generate a "hint" or additional context for the primary LLM.

The solution requires integration with existing AI systems. It is designed to operate as an API that developers can incorporate into their applications, similar to how payment processing systems are integrated into e-commerce platforms.

A technical challenge addressed by this solution is the limitation of current LLMs in understanding and replicating natural human conversation patterns. By training on voice data and incorporating prosodic elements, the system aims to capture nuances of human communication that are often lost in text-based training.

The expected outcome of implementing this solution is more natural and context-aware AI responses in conversational applications. This could lead to improved user experiences in areas such as customer service chatbots, language learning applications, and other AI-driven conversational interfaces.

The solution also incorporates a novel approach to model adaptation. Instead of periodic retraining, it uses a form of reinforcement learning where the model's responses are evaluated in real time based on user reactions. This allows for continuous improvement and personalization of the model for individual users.

In terms of technical specifications, the solution involves processing audio signals. It also employs various natural language processing techniques, including sentiment analysis and speaker diarization.

The rationale behind this solution is that by more closely mimicking human conversational patterns and understanding, AI systems can provide more effective and natural interactions without requiring ever-larger models and computational resources. This approach aims to address the limitations of current LLMs, which, while highly knowledgeable, often struggle with contextual understanding and natural conversation flow.

Glossary of Terms

Some of the concepts used for the description of the solution are presented below.

Large Language Model (LLM): A type of artificial intelligence model trained on vast amounts of text data to understand and generate human-like text.

Prompt engineering: The practice of crafting specific inputs to elicit desired responses from language models.

Diarization: The process of separating an audio stream into segments corresponding to different speakers.

Timestamping: The act of marking the start and end times of each segment of audio data. This helps in aligning audio with corresponding text or annotations Prosody: The patterns of rhythm, stress, and intonation in speech that convey meaning beyond the words themselves.

Semantic Annotation: The process of adding metadata to audio or text data to provide additional context, such as identifying emotions, sarcasm, or other conversational cues.

Phoneme: The smallest unit of sound in speech that can distinguish one word from another in a language.

Morpheme: The smallest meaningful unit in a language, which can be a word or a part of a word.

Intuition Module: The component of the proposed solution that runs alongside the primary language model to provide additional context and guidance.

Test Time Compute: The process of adapting or fine-tuning a model in real-time during its use rather than only during a separate training phase.

Fine-tuning: The process of adjusting a pre-trained model on a specific dataset or task to improve its performance.

API (Application Programming Interface): A set of protocols and tools for building software applications, allowing different systems to communicate with each other.

Automated Speech Recognition (ASR): Technology that converts spoken language into written text.

Sentiment Analysis: The process of determining the emotional tone behind a series of words, used to gain an understanding of attitudes, opinions, and emotions.

Intonation: The variation in pitch while speaking, which can convey different meanings or emotions. Intonation is an aspect of prosody in speech.

Reinforcement Learning: A type of machine learning where an agent learns to make decisions by taking actions in an environment to maximize a reward.

Conversational String: A sequence of related utterances in a conversation that forms a coherent thread or topic.

Preprocessing: The initial stage of data processing is when raw data is cleaned and formatted for further analysis.

Whisper: An open-source speech recognition system developed by OpenAI.

Text-to-Speech: Technology that converts written text into spoken words.

Mel-frequency Cepstral Coefficients (MFCCs): A representation of the short-term power spectrum of sound, commonly used in audio processing and speech recognition.

Real-time Feedback: A mechanism that allows a system to adjust its behavior based on immediate input or performance evaluation, often used in training models to improve their adaptability.

FIG. 1 is a block diagram illustrating a networked system 100 for an AI chatbot system, according to some examples. The networked system 100 includes one or more client devices, such as client device 110. The client device 110 can include a mobile phone, desktop computer, laptop, Portable Digital Assistant (PDA), smartphone, tablet, netbook, laptop, multi-processor system, microprocessor-based or programmable consumer electronics, game console, set-top box, computer in a vehicle, headwear, smart glasses, smartwatch, or any other communication device that a user may utilize to access the networked system 100. In some examples, the client device 110 includes a display module to display information (e.g., in the form of graphical user interfaces). In further examples, the client device 110 includes one or more of touch screens, accelerometers, gyroscopes, cameras, microphones, global positioning system (GPS) devices, and so forth. The client device 110 may be a device of a user that is used to access and utilize AI chatbot systems via an AI-bot sharing system 124 implemented by an application server 102.

For example, the client device 110 may be used by a user to navigate to a website or server of the AI-bot sharing system 124. In some examples, the client device 110 may include a dedicated AI-bot sharing system 124 application with the same or similar functionality as the website or server. Any functionality described with respect to the AI-bot sharing system 124 (or AI chatbot sharing system) that is implemented on the application server 102 can be performed exclusively or in a distributed manner on respective client devices 110. The AI-bot sharing system 124 can implement a plurality of AI chatbots, with each associated with a different user or client device 110. Each AI chatbot can be implemented by a machine learning model (e.g., a neural network) and trained to respond to queries transmitted or received from one or more users. Namely, the parameters of the AI chatbot can be used to generate a suitable response to a query that is in a structured or unstructured language format. In some examples, the AI chatbot can access one or more information sources over the Internet (e.g., a Wikipedia or encyclopedia) and/or one or more social networks and/or a user profile to formulate and generate a suitable response. The AI chatbot allows the user to provide queries in the form of text, speech, image, or video, and can generate and output responses in the same or different form, such as text, speech, image, or video.

In some examples, after accessing the website, the user inputs personal information (e.g., name, address, phone number, payment information, and so forth) to subscribe to the AI-bot sharing system 124 to be provided with the disclosed sharing functionalities. In some examples, the subscription fee is paid monthly but can be paid on any other periodic interval (e.g., weeks, daily, every other month, annual, lifetime, and so forth). After subscribing to the AI-bot sharing system 124, the user is provided with login credentials that can be used to navigate and browse available shared conversations on the AI-bot sharing system 124 to clone into the AI-bot implemented on the client device 110 of the user. Namely, once a conversation, context, or personality of interest is found on the AI-bot sharing system 124, input can be received from the user to retrain or update the AI chatbot that is associated with the user. In response to such input, the parameters of the first machine learning model of the AI bot associated with the first user are updated to clone or copy the conversation, context, or personality of interest associated with a second user that is selected.

In some examples, the parameters of the first machine learning model are updated by retrieving one or more parameters of a second machine learning model corresponding to the conversation or context or personality of interest of the second user that is selected and replacing, adding, or modifying the parameters of the first machine learning model with the retrieved parameters. This enhances privacy protection as the underlying conversation data of the second user is not received or shared; only the parameters of the second machine learning model represent such a conversation. The intention is to recreate some of the benefits of personalization through cookies, but without the concerns and limitations of disclosing personally identifiable information. In some examples, the underlying conversation snippet or content (including one or more messages exchanged between the second user and the second machine learning model) is used to retrain the parameters of the first machine learning model to provide the same conversation context or personality of interest that is selected.

One or more users may be a person, a machine, or other means of interacting with the client device 110. In some examples, the user may not be part of the networked system 100 but may interact with the networked system 100 via the client device 110 or other means. For instance, the user may provide input (e.g., touch screen input or alphanumeric input) to the client device 110, and the input may be communicated to other entities in the networked system 100 (e.g., third-party servers 130, server system 108, etc.) via a network 104. In this instance, the other entities in the networked system 100, in response to receiving the input from the user, may communicate information to the client device 110 via the network 104 to be presented to the user. In this way, the user interacts with the various entities in the networked system 100 using the client device 110.

The networked system 100 further includes a network 104. One or more portions of network 104 may be an ad hoc network, an intranet, an extranet, a virtual private network (VPN), a local area network (LAN), a Wireless LAN (WLAN), a Wide Area Network (WAN), a Wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the networked system 100 via a web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a travel services application, a real estate application, an AI chatbot application, and the like.

In some examples, one or more client applications 114 are included in a given one of the client devices 110 and configured to provide the user interface locally and at least some of the functionalities, with the client application 114 configured to communicate with other entities in the networked system 100 (e.g., third-party servers 130, server system 108, etc.), on an as-needed basis, for data and/or processing capabilities not locally available (e.g., to access location information, to access travel services information, such as cost and availability, to authenticate a user, to verify a method of payment, etc.). Conversely, one or more applications 114 may not be included in the client device 110. Then, the client device 110 may use its web browser to access the one or more applications hosted on other entities in the networked system 100 (e.g., third-party servers 130, server system 108, etc.).

A server system 108 provides server-side functionality via the network 104 (e.g., the Internet or WAN) to one or more third-party servers 130 and/or one or more client devices 110. The server system 108 includes an application server 102 that implements an application program interface (API) server 120, a web server 122, and the AI-bot sharing system 124, which may be communicatively coupled with one or more databases 128. The one or more databases 128 may be storage devices that store data related to users of the system 108, applications associated with the system 108, cloud services, conversation data, one or more machine learning techniques (or machine learning models), and so forth. The one or more databases 128 may further store information related to third-party servers 130, third-party applications 132, client devices 110, client applications 114, users, and so forth. In some examples, the one or more databases 128 may be cloud-based storage.

In some examples, the one or more databases 128 may be cloud-based storage. The one or more databases 128 may store past conversation data or interaction data for one or more users. The one or more databases 128 can store the parameters of the individual machine learning models that implement the respective AI chatbots for different users of the system. The one or more databases 128 can store descriptions of different cloned conversations, shared conversations, or personalities of different AI chatbots. These descriptions can be presented on a webpage or a graphical user interface for other users to browse. These descriptions can also be stored as metadata to exchange as ingredients in a more complex combination. The other users can select the descriptions, which are then used to retrieve a corresponding set of data representing the context of conversations to adopt into their own AI chatbots. The one or more databases 128 can also store a counter for each set of conversations that indicates the number of times the corresponding set of data has been cloned or adopted. This enables the graphical user interface to sort the set of available data corresponding to the different conversation contexts according to popularity (e.g., higher value counters can represent higher popularity).

The one or more databases 128 can also store geographical restrictions for each of the sets of data representing the context of conversations. Such geographical restrictions can be used to impose a geo-fence around each of the set data representing the context of conversations to limit which set data representing the context of conversations are presented to particular users on a graphical user interface based on the current location of the users. For example, a user who is using a client device 110 in a first geographical location can access the graphical user interface to obtain a set of data representing the context of conversations. The first geographical location can be used to search the one or more databases 128 for the set data representing the context of conversations that is associated with a geo-fence that is within a threshold distance (e.g., 10 miles) of the first geographical location. As such, the graphical user interface can be presented on the client device 110 and includes a first subset of the set of data representing the context of conversations. A user can use a client device 110 in a second geographical location to access the graphical user interface and obtain a set of data representing the context of conversations. The second geographical location can be used to search the one or more databases 128 for the set data representing the context of conversations that is associated with a geo-fence that is within a threshold distance (e.g., 10 miles) of the second geographical location. As such, the graphical user interface can be presented on the client device 110 at the second geographical location, which includes a second subset of the set of data representing the context of conversations different from the first subset. This prevents users from cloning conversation contexts that are beyond their current geographical locations by more than a threshold distance.

The server system 108 may be a cloud computing environment, according to some examples. The server system 108 and any servers associated with the server system 108 may be associated with a cloud-based application in some examples.

The server system 108 includes the AI-bot sharing system 124. The AI-bot sharing system 124 includes one or more modules, storage devices, and databases. The modules in the AI-bot sharing system 124 are configured to train a machine learning technique to generate a response to a query received from a client device 110 by establishing relationships between known (training or ground truth) responses and known (training or ground truth) queries. The modules in AI-bot sharing system 124 are configured to enable a user of a first client device 110 that implements or accesses a first AI chatbot to replicate, adapt, and/or clone a context of a conversation that a different user of a second client device 110 had with a second AI chatbot (different from the first AI chatbot).

For example, the second user may interact by way of the second client device 110 with the second AI chatbot for a period of time, such as one day, one week, one year, one second, or any other suitable threshold time period. During the interaction, the second AI chatbot learns certain behaviors, interest levels, experience levels, and user details. These can be referred to as contexts associated with the conversation or interaction. For example, the second AI chatbot can learn over time that the second user may have a first political affiliation, views, or has a first level of experience with a subject, and likes to receive responses with a first level of detail. The second client device 110 can receive input from the second user requesting to share the context of the second AI chatbot. The context can be associated with a portion of the conversation that the user had with the AI chatbot at a particular time, one or more messages that were exchanged, the entire history of conversations or interactions, or any other suitable representation of the interactions the second user had with the second AI chatbot. The second client device 110 can associate a description (e.g., input by the user or automatically generated based on keywords of the conversation) with the context.

The second client device 110 can then share the description and a link to the set of data corresponding to the context with one or more other users through a message. The message can be encrypted or unencrypted. The message can be a directed communication from the second client device 110 to the first client device 110 (e.g., an SMS or text message) or can be posted on a public or private website, forum, blog, social media network page, or article. The first client device 110 can receive the message (e.g., by way of direct communication or by selecting the message from the website where it is shared) and can receive input from the first user selecting an option to clone or adopt the set of data corresponding to the context of the second user. In response, the first client device 110 can use the data associated with the context to re-train or update the parameters of the first AI chatbot associated with the first client device 110. In this way, the first client device 110 can receive a query from the first user and can use the first AI chatbot to generate a response to the query using the set of data corresponding to the context of the second user.

For example, the response generated by the first AI chatbot can represent the first political affiliation, views, or the first level of experience with respect to the subject, and the first level of detail that the second AI chatbot was trained to generate. In this way, the first user can avoid having to spend the period of time training the first AI chatbot to generate such responses, as this period of time spent training the second AI chatbot has already been spent by the second user. As such, the first user can pick up where the second user has left off in a conversation context. In some examples, prior to updating the first AI chatbot to represent the first political affiliation or views or the first level of experience with respect to the subject and the first level of detail of the second user, the first AI chatbot can be trained to generate a first type of response to a particular query. After updating the first AI chatbot to represent the first political affiliation or views or the first level of experience with respect to the subject and the first level of detail of the second user, the first AI chatbot becomes trained to generate a second type of response to the same particular query.

The networked system 100 further includes one or more third-party servers 130. The one or more third-party servers 130 may include one or more third-party applications 132. The one or more third-party applications 132, executing on third-party server(s) 130, may interact with the server system 108 via the API server 120 via a programmatic interface provided by the API server 120. For example, one or more of the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108. Third-party servers 130 may implement an AI chatbot system, such as portions of the AI-bot sharing system 124. In some examples, a conversation context or data associated with the conversation context can be provided to the third-party servers 130 to enable users outside of the application server 102 to access this data to train their respective AI chatbots.

Figure 2:
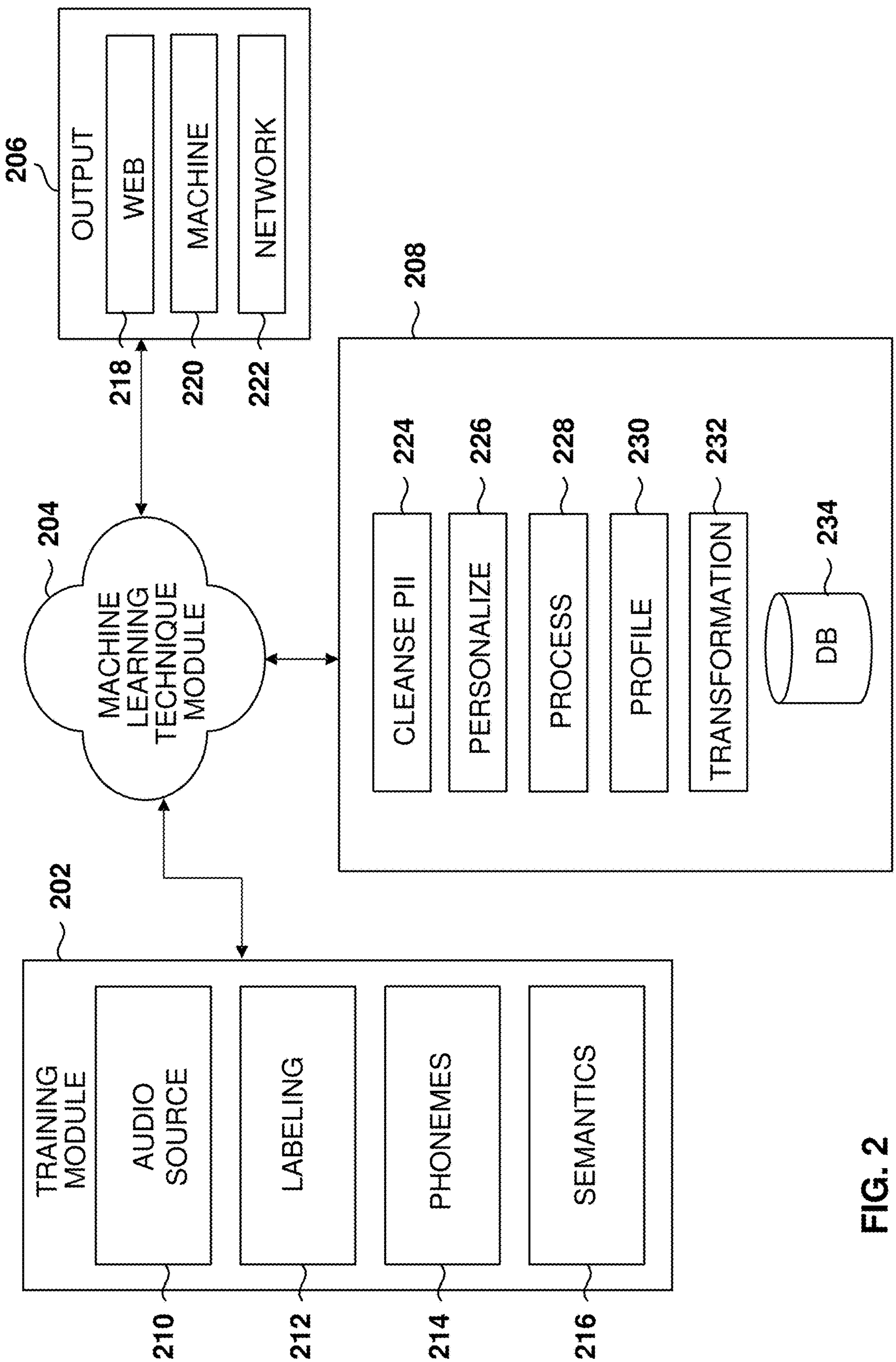
FIG. 2 shows a multi-layered architecture that depicts the functional layers of the SMLTalk system, according to some examples.

FIG. 2 shows a multi-layered architecture that depicts the functional layers of the SMLTalk system, according to some examples. SMLTalk is a system for enhancing chatbot interactions by determining the semantic meaning of conversations.

The issue observed with large language models is their considerable intelligence and the development of reasoning ability through text-based training. The majority of the information available for training originates from the Internet. This includes sources such as research papers, conversations on Reddit, Twitter, and any other online content. Large language models are trained on this diverse range of information.

Large language models exhibit a high level of proficiency in comprehending human language. However, these models demonstrate limitations in generating responses that align with human conversational context, as the responses resemble those found on the internet. While the models produce responses of considerable comprehensiveness, they do not effectively mimic the nuances of human dialogue.

Frequently, when individuals utilize large language models, the process is referred to as prompt engineering. This involves possessing precise knowledge of how to articulate requests in order to obtain the desired outcomes from the models. The process tends to be a source of frustration, particularly for novice users lacking familiarity with the operational mechanisms of these models. Such user experiences are often characterized by considerable frustration.

The issue is what the distinctions are between the learning processes of a language model and the human learning processes. Humans do not acquire communication skills predominantly through writing; instead, these skills are primarily developed through speech. The solution considered: what would occur if a language model were trained entirely on voice conversations as opposed to textual data? The outcome is that such a model begins to comprehend elements of intonation and pauses. Additionally, the model acquires knowledge of conversational turn-taking. For instance, during the initial encounter of this conversation, there is an acquisition of understanding regarding the conversation partner's experiences. In subsequent interactions, there is an alteration in interaction methods due to the adaptive learning from the prior exchange.

When an individual states something and no one comprehends the subject matter, the individual learns how to address the issue. Language models do not possess any comprehension of such situations. A substantial limitation of a language model is the absence of temporal awareness. Understanding the context of time is an element of human conversation.

An example involves accessing ChatGPT to request a 45-minute lesson in French. ChatGPT initially responds affirmatively, maintaining a consistently positive demeanor. However, after a brief interaction, typically around two exchanges, ChatGPT concludes the session with the phrase, "I'm all done. Can I assist with anything else?" This response occurs because ChatGPT cannot sustain the concept of a prolonged lesson.

In the presented solution, conversations are utilized. The process commences with the analysis of the audio, specifically the sound waves. A timestamp is applied to these. Subsequent to this, the audio is diarized to distinguish between different speakers: designated as speaker one, speaker two, and so forth. The text is processed such that each segment of speech receives a timestamp. This constitutes the input for the model. The model receives human conversation replete with intonation, sentiment, semantics, and accompanying timestamp information, which is utilized in the training process.

The system possesses the capability to determine the appropriate timing for responses. In instances where an individual presents an extensive statement, the system might ascertain that the individual is merely expressing emotions and not actively seeking a solution. The system may interpret and acknowledge the difficulty of the situation. Through this process, the system acquires such interpretive attributes. Subsequently, the developed model is integrated with ChatGPT or OpenAI. During interactions, dialogue is conducted with the primary model.

The model, named Intuition, operates by monitoring the conversation. Subsequently, it identifies the actual intent of the user, drawing from its training data, and offers a suggestion concurrently as other dialogues proceed. In instances where a technical element is present, but the suggestion is not generated promptly, and the primary language model has already issued a response, the information is incorporated into the model's history. Consequently, the subsequent response from the AI model reflects this updated context, enabling it to adjust its output accordingly in real time.

SMLTalk is a pipeline-driven conversational AI system that converts voice-based conversational inputs into a Semantic Markup Language (SML). The system can optionally integrate a smaller companion model ("Intuition") that leverages time-stamped conversation data, emotional cues, and turn-taking dynamics to optimize how LLMs process user inputs over extended interactions.

SMLTalk includes voice-to-text processing and enrichment. SMLTalk begins by transcribing user voice data into text. An enrichment layer adds linguistic and contextual markup based on factors such as emotional tone, speaker intent, and domain-specific cues. Markers like focal enhancers highlight critical concepts (e.g., "quadratic equations"), affective tags represent emotional states (e.g., "anxious," "frustrated," or "excited"), and deictic references anchor prior conversation segments in time.

The term deictic refers to words or expressions in language that rely on context to convey meaning. These expressions point to specific entities, times, places, or participants, and their meaning shifts depending on the speaker, listener, or the situational context in which they are used. Deictics are crucial in communication because they anchor speech to the physical or social situation.

SMLTalk includes an optional dedicated "Intuition" module, which is a smaller model than an LLM, that is trained on timestamped, one-to-one conversation data. Intuition maintains turn-by-turn context (tracks the flow of dialogue across multiple turns, preserving continuity), understands time (incorporates timestamps to note when topics were mentioned, how long the user waited, and how the user's emotional state might change over time), and generates semantic hints (produces instructions, context summaries, or SML tags that reflect the user's emotional tone, intent, or knowledge gaps for the primary LLM to incorporate).

SMLTalk's memory pipeline stores conversation states and structural metadata (including timestamps, emotional trajectory, and user preferences). This allows the system to respond with contextual coherence across extended conversations, even if interrupted by time gaps.

The enriched SML data, combining voice transcription, semantic tags, user emotional states, and any output from the "Intuition" module, is converted into an optimized prompt for the primary LLM. This ensures the final prompt is:

Time-aware: timestamps or references to "yesterday" or "an hour ago" are explicitly included, aiding the LLM in temporal reasoning;

Emotionally attuned: affective markers guide the LLM to respond empathetically if the user is anxious or frustrated; and Task-focused: directs the LLM to provide error analysis, domain-specific knowledge, or compliance with established standards.

SMLTalk can incorporate feedback from the user (e.g., clarifications and follow-up questions) and update the memory pipeline accordingly. Repeated interactions refine how SML is structured and how prompts are generated, culminating in a system that learns user preferences and context over time.

The advantages provided by SMLTalk include:

Enhanced human-like dialogue: by embedding emotional, contextual, and temporal markers, SMLTalk enables more fluid, turn-based conversations;

Dynamic personalization: the optional "Intuition" model's specialized training can detect user frustration or confusion earlier, adjusting the system's approach in real-time;

Robust context retention: timestamps plus semantic markers result in rich, multi-turn continuity, ideal for complex tasks or elongated sessions; and Broad applicability: education, healthcare, customer support, and accessibility can all benefit from voice-first, cognitively adaptive, and empathetic AI assistance.

Overview of SMLTalk System Architecture

The SMLTalk system is designed to process voice-based conversational inputs through a multi-layered data pipeline, converting spoken user dialogue into a structured Semantic Markup Language (SML). This SML is then utilized to generate optimized prompts for one or more Large Language Models (LLMs).

Optionally, SMLTalk includes a smaller companion model ("Intuition") that specializes in multi-turn conversation with timestamped data. The Intuition module provides semantic instructions or contextual overlays to the primary LLM, including references to time intervals, user confusion states, or priority tasks.

The system components include an audio processing layer, a semantic enrichment layer, the Intuition module, a memory pipeline, a prompt optimization layer, and response generation and delivery The audio processing module captures user speech in real-time, employing advanced Automatic Speech Recognition (ASR) to produce textual transcriptions. For robust emotional and paralinguistic cues, the system may capture pitch, intonation, pacing, and pauses. These features can inform the subsequent enrichment layer about urgency or affective state.

The semantic enrichment layer receives the raw transcript and applies NLP-based and signal-based analyses to identify user intent (e.g., error analysis request, conceptual explanation), emotional states (e.g., anxious, frustrated, enthusiastic), key focal points (e.g., "factoring equations," "sales figures," or "delivery schedule"), and time/deictic references (e.g., "yesterday," "earlier," "two hours ago").

This layer converts the enriched data into SML by inserting appropriate tags (e.g., <affect="anxious">, <time_ref="yesterday">).

The Intuition module, unlike a large-scale LLM with massive general training, is trained exclusively on one-to-one conversation data with embedded timestamps and user-labeled contexts (e.g., "speaker was frustrated at t=5:35"). Its functions include: time-aware context tracking (maintains a dynamic memory of conversation turns, factoring in real-world time intervals (e.g., how many minutes, hours, or days elapsed)); semantic layering (produces structured hints or instructions describing the user's probable intent, emotional trajectory, or confusion points); and turn-taking guidance (helps the system anticipate when the user might need a pause, a clarification, or a more direct question).

Data from Intuition merges seamlessly with SML tags to produce a contextually rich markup for the primary LLM to consume.

The memory pipeline stores aggregated conversation data, including user IDs, timestamps, emotive state progressions, and prior SML segments. When the user returns after a gap, the system reactivates relevant data from the memory pipeline, ensuring the LLM sees continuity in the conversation.

The prompt optimization layer merges the updated SML from the semantic enrichment layer, any specialized output from Intuition, and past conversation states from the memory pipeline to produce a single, consolidated, natural language prompt that is highly tailored to the user's situation. This prompt might explicitly mention time references, emotional states, and prior tasks in a structured format that the LLM can parse effectively.

In response generation and delivery, the final natural language prompt is passed to the LLM, which responds accordingly. The system then returns the LLM's response to the user, potentially via text-to-speech for continued voice-based interaction, and logs the exchange back into the memory pipeline.

In one example, a user says, "I tried factoring $x^2-4x-5=0$, but I'm stuck again, like yesterday. Help me see my mistake?"

The system then transcribes the audio to text, detects "yesterday" as a time-based reference, notes user frustration from the speech pattern, and marks up the text with tags: <time_ref="yesterday"> and <affect="frustrated">.

The Intuition module retrieves from the memory pipeline that the user requested factoring help "24 hours ago," determines that the user likely needs a step-by-step approach, and injects an additional SML note such as <guidance="step_by_step">.

During prompt optimization, a combination is made with the user's current SML, prior conversation history (e.g., "previous factoring advice was given 24 hours ago"), and the Intuition module's hint (step-by-step approach) into a structured prompt. Intuition then sends the prompt to the LLM: "User has tried factoring $x^2-4x-5=0$ again, is frustrated, and references help from 24 hours ago. Provide step-by-step guidance with an empathetic tone."

The LLM returns a detailed explanation. If the user remains confused, the system logs that feedback, updates the memory pipeline, and might escalate to a more illustrative approach in the next turn (e.g., "Try drawing a number line" or "Let's compare your approach to a standard factoring method").

Large Language Models (LLMs) such as GPT and related architectures are typically trained on massive corpora of text from websites, social media, or digitized books. While these general-purpose training sets capture broad linguistic patterns, they often overlook fine-grained, real-time conversational details, especially those involving timestamps and turn-by-turn user interactions in one-to-one dialogues.

Conventional conversational AI systems tend to rely on either generic text corpora (sourced from static text (e.g., websites, books), which lack speaker-specific context, emotional transitions, or real-time indicators), and create limited chat logs (many chat datasets do not systematically include timestamp metadata, emotional tags, or detailed user-intent annotations across extended sessions).

As a result, these systems typically fail to: understand true multi-turn flow as they treat conversations as disjoint sets of text snippets rather than continuous dialogues with real-time progression; capture emotional or intent shifts: subtle changes in user intent or emotional state over time are lost without explicit labeling; and reference elapsed time: references to "two days ago" or "two minutes ago" are rarely grounded in actual timestamps, leading to confusion about continuity or urgency.

A specialized training set that includes timestamped, one-to-one human conversations (annotated for speaker intent, emotional states, task contexts, and turn-taking) could enable the training of the smaller companion model Intuition, which operates as an overlay or secondary module in a larger conversational AI framework. This smaller model would facilitate more contextually coherent and time-aware AI interactions.

The architecture is composed of several modules, including a training module 202, a machine-learning technique module 204, a processing module 208, and an output module 206.

The training module 202 serves as the starting component of the architecture, tasked with receiving and processing input data. The training module 202 includes an audio source 210 (captures audio inputs for subsequent processing), labeling 212, phonemes 214, and semantics 216.

The labeling 212 component assigns labels to the audio data, aiding in the categorization and identification of various elements within the input. Phonemes 214 are extracted from the audio data, offering a detailed level of analysis that assists in understanding the spoken content. Semantics 216 enhances the data by interpreting the meaning and context of the audio inputs, allowing the system to grasp the subtleties of human speech.

A machine learning technique module 204 utilizes advanced machine learning algorithms to process and analyze the data received from the training module 202. The machine learning technique module 204 transforms raw audio data into actionable insights and responses, leveraging the labeling 212, phonemes 214, and semantic 216 information to enhance the system's understanding and predictive capabilities.

The processing module 208 includes cleansing PII 224 (Personally Identifiable Information), personalize 226, process 228, profile 230, transformation 232, and database 234.

Cleanse PII 224 removes personally identifiable information from the data, ensuring privacy and compliance with data protection regulations. Personalize 226 adapts the responses to individual user preferences and characteristics, enhancing the user experience. Process 228 handles the primary data processing tasks, transforming the input data into structured formats suitable for analysis and response generation. Profile 230 builds user profiles based on historical data and interactions, allowing the system to tailor responses more effectively. Transformation 232 converts the processed data into formats that can be utilized by the machine learning technique module 204 and other system components. The database 234 component serves as a storage repository for the system, maintaining a database of processed data, user profiles, and other relevant information. This database supports the system's operations by providing a centralized location for data retrieval and management, ensuring that the system can access historical data and insights to inform responses and actions.

The output module 206 includes a web module 218, a machine 220, and a network 222. The output module 206 is responsible for delivering the processed data to various endpoints. The web module 218 component facilitates the integration of the system with web-based applications and services. The machine 220 component ensures compatibility with different hardware and software environments, allowing the system to operate seamlessly across various platforms. The network 222 component provides connectivity, enabling the system to communicate and exchange data with external networks and systems.

The solution provides systems and methods for collecting, curating, annotating, and preparing a timestamped conversational data set that can be used to train specialized "companion" or "Intuition" models. These smaller models, once trained, may be integrated with or supplement LLMs to address complex, multi-turn, emotionally-aware, and time-based interactions.

The solution includes the following features:

Timestamp-rich data collection: the solution discloses techniques for capturing exact timestamps (e.g., "2025-01-10 14:05:32") for each speaker utterance, maintaining a robust record of elapsed time between conversation turns.

One-to-one conversation recording: unlike typical group chat logs, the system ensures that the data comprises one-to-one dialogues, thus capturing direct user-to-user or user-to-agent exchanges that better model real human conversational patterns;

Semantic annotation: SMLTalk applies human or semi-automated labeling to each utterance with intent indicators, emotional states (e.g., "frustrated," "excited"), task markers (e.g., "requesting help on factoring an equation"), and any other relevant metadata;

Turn-taking and contextual linking: each utterance is labeled with a turn ID and speaker ID, and is linked to prior and subsequent utterances in the dataset. This structure allows the resulting training corpus to reflect actual multi-turn flow, including how context evolves over time;

Pipeline for creating Intuition training splits: the solution details how the curated dataset is split into training, validation, and test sets, specifically optimized for a smaller companion model that is intended to supply semantic or time-based hints to a primary LLM; and Data Governance and Compliance: SMLTalk addresses privacy and compliance aspects by anonymizing user identities and ensuring secure storage of sensitive timestamps or domain-specific contexts.

The advantages Over Conventional Datasets include:

Improved time-aware modeling: by embedding fine-grained timestamps, trained models can learn to reference and reason about "recent" versus "past" events;

Enhanced emotional intelligence: labeled emotional states across conversation turns allow the companion model to anticipate user frustration, confusion, or satisfaction;

Turn-by-turn coherence: structured turn IDs and speaker IDs encourage the model to respect typical conversation flow, enabling more natural, human-like responses; and Facilitation of specialized Intuition: The curated dataset enables a smaller model to become adept at managing context over multiple turns, complementing a general-purpose LLM's broader knowledge.

The data sources for the training data include customer service chats where a single agent interacts with one user; telehealth or counseling platforms featuring real-time, private dialogues; and educational tutoring sessions recorded or transcribed with exact timestamp metadata.

Each utterance is tagged with a high-precision timestamp. For instance:

java

Copy code

User A (14:05:32): "I need help with factoring this polynomial."

User B (14:06:01): "Sure, can you share the equation?"

The elapsed time between turns (29 seconds) is retained, enabling future analyses of response speed and user frustration signals.

Sensitive user information is anonymized or hashed. Speaker IDs (e.g., Speaker 001, Speaker 002) are assigned to maintain continuity while preserving privacy.

For the annotation and labeling process, in some examples, SMLTalk Core defines a labeling schema that includes:

Intent Tags (e.g., "requesting info," "providing info," "expressing confusion");

Emotional States (e.g., "frustrated," "happy," "neutral");

Task Markers (e.g., "factoring equation," "shipment status"); and

Time/Deictic Reference tags (e.g., "referring to the previous day," "urgent request").

A pipeline can first run automated classifiers (sentiment analysis, intent detection) and then pass the data to human annotators for verification. This multi-step approach balances scale with accuracy.

After labeling is complete, a Quality Assurance (QA) module checks for inconsistencies (e.g., two conflicting emotional states in the same utterance or missing timestamps). Identified anomalies are flagged for manual review.

Three methods are used to structure conversations for training: turn-based segmentation, conversation session grouping, and JSON/XML data formatting.

Conversations are segmented into turn sequences, each containing a speaker ID, timestamp, textual content, and annotation tags. This ensures the final dataset can be easily fed into a model architecture that expects chronologically ordered inputs.

When a conversation is paused or resumed hours later, the system links session segments by user ID and logs the gap in timestamps. Future training can exploit these intervals to learn long-term context retention.

One example of JSON or XML format is as follows:

json

Copy code

```
{
  "conversation_id": "12345",
  "turns": [
    {
      "turn_id": 1,
      "timestamp": "2025-02-10T14:05:32Z",
      "speaker_id": "Speaker_001",
      "text": "I need help with factoring.",
      "intent": "help_request",
      "emotion": "frustrated",
      "elapsed_since_last": 0
    },
    . . .
  ]
}
```

This structured representation makes it straightforward for training pipelines to parse the data.

Although the curated dataset could be used for general model training, one significant use case is training a smaller companion model for multi-turn conversation management. The method includes the following operations:

Dataset Splitting: SMLTalk splits the conversation data into training, validation, and test sets. Splits are stratified by domain (e.g., math tutoring vs. customer service) to ensure balanced coverage.

Time-aware batching: during training, examples may be batched in chronological order so the model can learn to handle real-time or extended intervals.

Speaker and emotional state conditioning: the smaller model can be conditioned on speaker IDs and emotional states, learning to provide context overlays ("user is frustrated, likely wants immediate reassurance") that can guide a primary LLM.

Model architecture considerations: RNN-based or transformer-based architectures can be used, with additional input channels for timestamps and emotional labels. The solution is agnostic to the exact model type, focusing on the curated data and how it is fed to the architecture.

In various examples, the data curation pipeline, annotation tools, and companion model training might reside on cloud-based servers, enabling large-scale ingestion and parallel annotation workflows.

Third-party applications (e.g., customer service platforms, tutoring systems) can connect to the pipeline via APIs. Upon receiving raw conversation logs, the system automatically appends timestamps, runs annotation modules, and updates the curated dataset.

Where the dataset may contain personal or sensitive information, the system implements encryption at rest and in transit, compliance checks (e.g., GDPR), and robust anonymization routines.

One example is the scenario of Educational Tutoring. A service aggregates thousands of math tutoring sessions, each containing turn-by-turn dialogues. Each utterance is labeled with:

A timestamp (e.g., accurate to the second, tenth of a second, or hundredth of a second), Emotional states (confused, excited), and Task references (e.g., factoring polynomials, geometry proof).

These sessions form a training dataset of time-stamped, labeled conversations that a smaller Intuition model uses to develop advanced context-tracking capabilities, which it then provides as semantic hints to a primary LLM (e.g., GPT-based) for improved multi-turn question answering.

Figure 3:
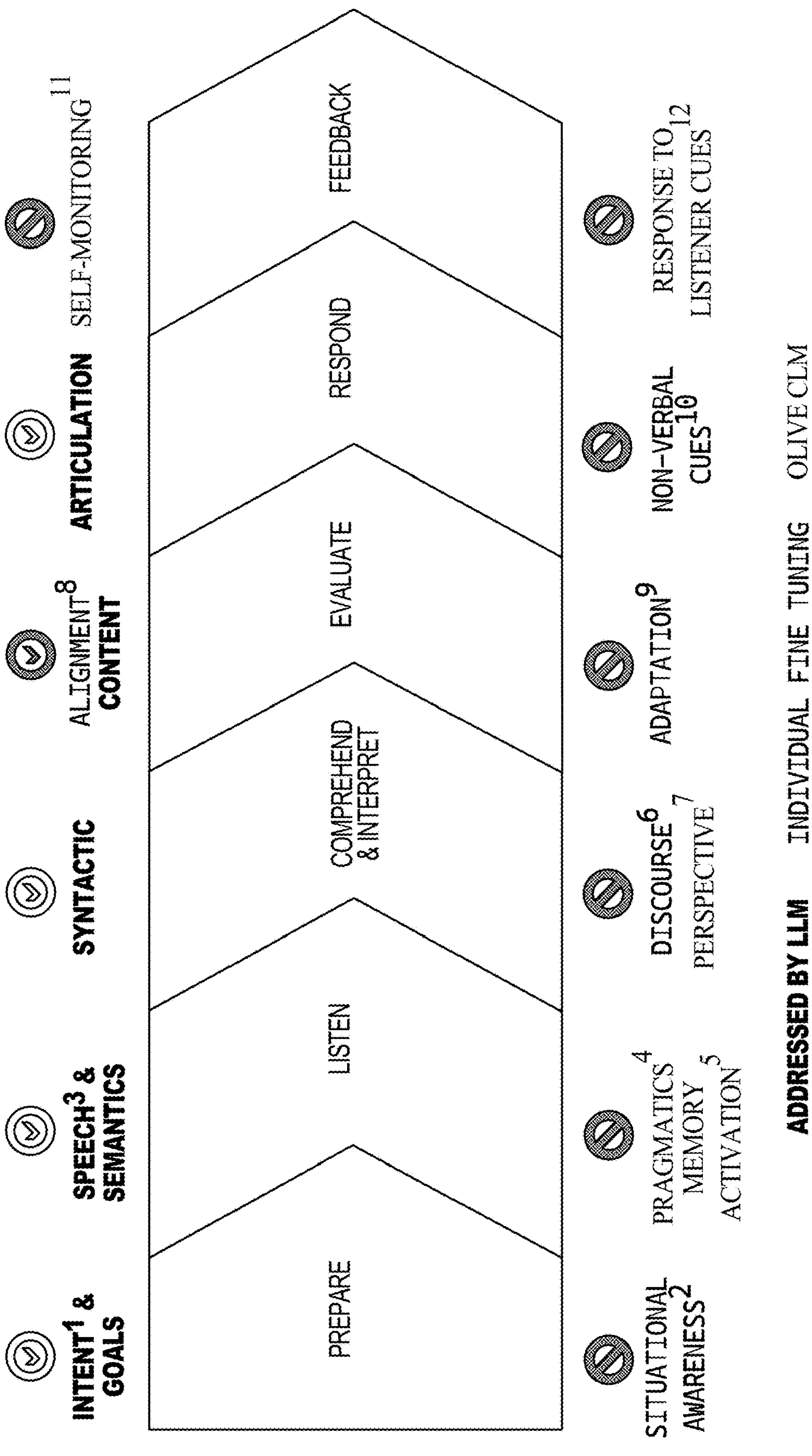
FIG. 3 shows the processing of a conversation by the primary model and the continuous ingestion of semantic cues by the companion module, according to some examples.

FIG. 3 shows the processing of a conversation by the primary model and the continuous ingestion of semantic cues by the companion module, according to some examples. FIG. 3 shows a comprehensive process for preparing responses within a conversational AI system, highlighting various components that contribute to the system's ability to understand and generate human-like interactions.

The Intuition model operates concurrently with pre-existing AI pathways. Consider a scenario where a developer has already configured their system to integrate with OpenAI. The Intuition model would function alongside this configuration. While OpenAI processes data from the user, whether it is text or voice, the Intuition model also conducts its own processing. The input to the Intuition model matches what the user inputs into OpenAI. Independent processing is performed by the Intuition model, utilizing mechanisms to interpret and comprehend the underlying meaning, with a specific focus on training with both voice and text data. This approach enables the extraction of a greater amount of data from the information provided by the user. Based on this analysis, the Intuition model generates suggestions for the LLM.

The solution operates concurrently with the current AI systems. Upon receiving the prompt, the systems can incorporate the information in any form necessary. The solution extracts data that text-based models currently lack access to.

In some examples, SMLTalk does not interact directly with the end user; instead, it provides an API for developers to integrate. The developer may utilize SMLTalk concurrently with the pre-existing data stream using the LLM. SMLTalk performs the task of extracting minute details from speech or text and subsequently uses that information to prompt the larger model.

The process includes operations to prepare for the interactions, listening, comprehending and interpreting, evaluating, responding, and providing feedback. This process emphasizes the integration of both linguistic and contextual elements to enhance AI interactions, including intent and goals, speech semantics, syntactic, alignment content, articulation, self-monitoring, situational awareness, pragmatics memory activation, discourse and perspective, adaption, non-verbal cues, and response to listener cues.

Intent and goals define the purpose of the interaction, such as informing, persuading, or seeking clarification. This component sets the direction of the conversation and aligns the AI's responses with the user's objectives. Subsequently, the speech semantics component concentrates on interpreting the meaning of spoken language, capturing nuances such as intonation and sentiment that are important for understanding the user's intent.

The syntactic component addresses the structural aspects of language, ensuring that the AI can parse and generate grammatically correct responses. This is complemented by the alignment content component, which ensures that the AI's responses are coherent and contextually relevant, aligning with the user's previous statements and the overall conversation flow.

Articulation and self-monitoring enhance the system's ability to deliver responses clearly and effectively. Articulation involves the precise expression of ideas, while self-monitoring enables the AI to evaluate its own output, detecting and correcting errors to enhance communication clarity.

Situational awareness and pragmatics memory activation enhance the AI's ability to comprehend and interpret the context of the conversation. Situational awareness involves recognizing the context in which the conversation occurs, while pragmatics memory activation retrieves relevant knowledge and experiences to provide a richer understanding of the input.

Discourse perspective and adaption further enhance the AI's interpretative capabilities. Discourse perspective relates the current input to previous statements for continuity, while adaption allows the AI to adjust responses based on the user's emotional state and feedback.

Non-verbal cues and responses to listener cues assist in capturing and responding to the subtleties of human communication. Non-verbal cues involve interpreting gestures, facial expressions, and other non-verbal signals, while the response to listener cues involves adapting the AI's responses based on the listener's reactions, such as nodding or expressions of confusion.

Figure 4:
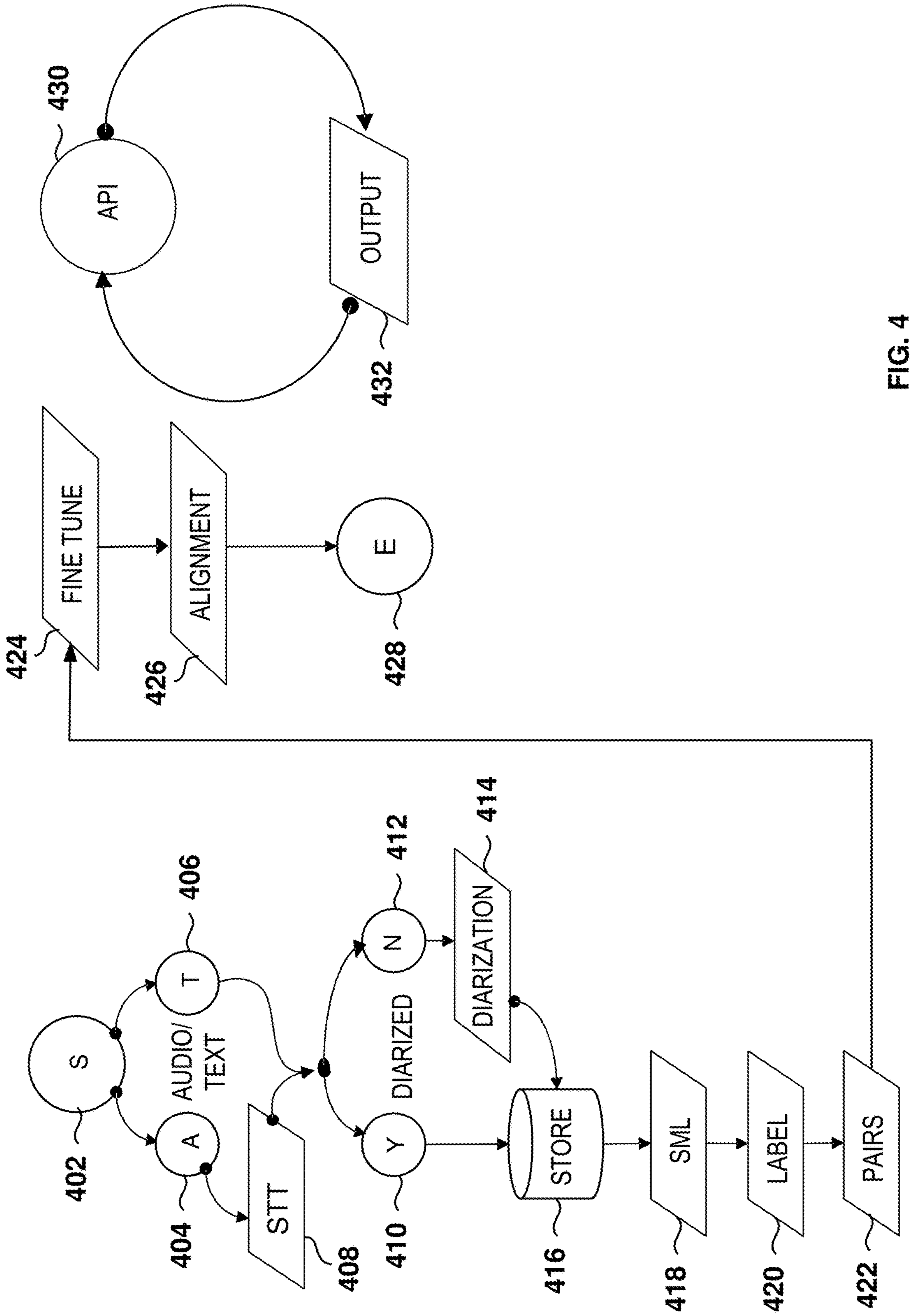
FIG. 4 illustrates a process for generating responses, according to some examples.

FIG. 4 illustrates a process for generating responses, according to some examples. The input S 402 can be either audio 404 or text 406. The process identifies the nature of the input, determining whether the input is audio 404 or text 406. The audio input is processed through a Speech-to-Text (STT) module 408, which converts the audio input into text format.

The process checks whether the input has been diarized. If the input is diarized (Y 410), the diarized data is stored in database 416. If the input is not diarized (N 412), the process undergoes diarization 414. Diarization 414 is the process of separating individual speakers into distinct channels and adding timestamps to the conversation.

The diarized data is stored in database 416 for further processing. The data is then subjected to Semantic Markup Language (SML) processing 418, which adds classifications such as emotion and intonation to the text. This semantic markup assists in understanding the context and emotional tone of the conversation. The label 420 process adds labels to the data, such as describing the type of conversation and assigning values to discourage undesired discourse during training. The labeled data is then organized into pairs 422, which are used for training and fine-tuning the model. Pairs are examples of the inputs to the model and the outputs generated by the model in response to the respective inputs.

The fine-tune component 424 refines the model using the pairs, ensuring that the model is tailored to the specific nuances of the input data. The alignment component 426 checks the output for alignment with a set of pre-defined safety prompts, ensuring that the model's responses are appropriate and safe. Alignment is the process of making sure that the model does not do something improper in order to guarantee safety. The result is the aligned data 428.

Once the output is aligned, the model is updated to the current API's fine-tuned model through the API component 430. The output 432 represents the generated response, which is the result of the entire process, incorporating all the semantic, emotional, and contextual information processed through the system.

Some of the advantages over existing approaches include:

The SMLTalk system, potentially augmented by the Intuition module, addresses key gaps in conversational AI;

Deep context retention: by combining SML markup with a memory pipeline, the system preserves context across extended interactions;

Time-aware dialogues: timestamps allow referencing past events accurately, enabling more human-like continuity;

Adaptive emotional intelligence: affective tagging informs the LLM to adjust tone or detail, enhancing user satisfaction; and Flexibility and modularity: the entire pipeline can function with or without the Intuition module. This architecture supports both simpler single-session use and advanced multi-turn memory.

Figure 5:
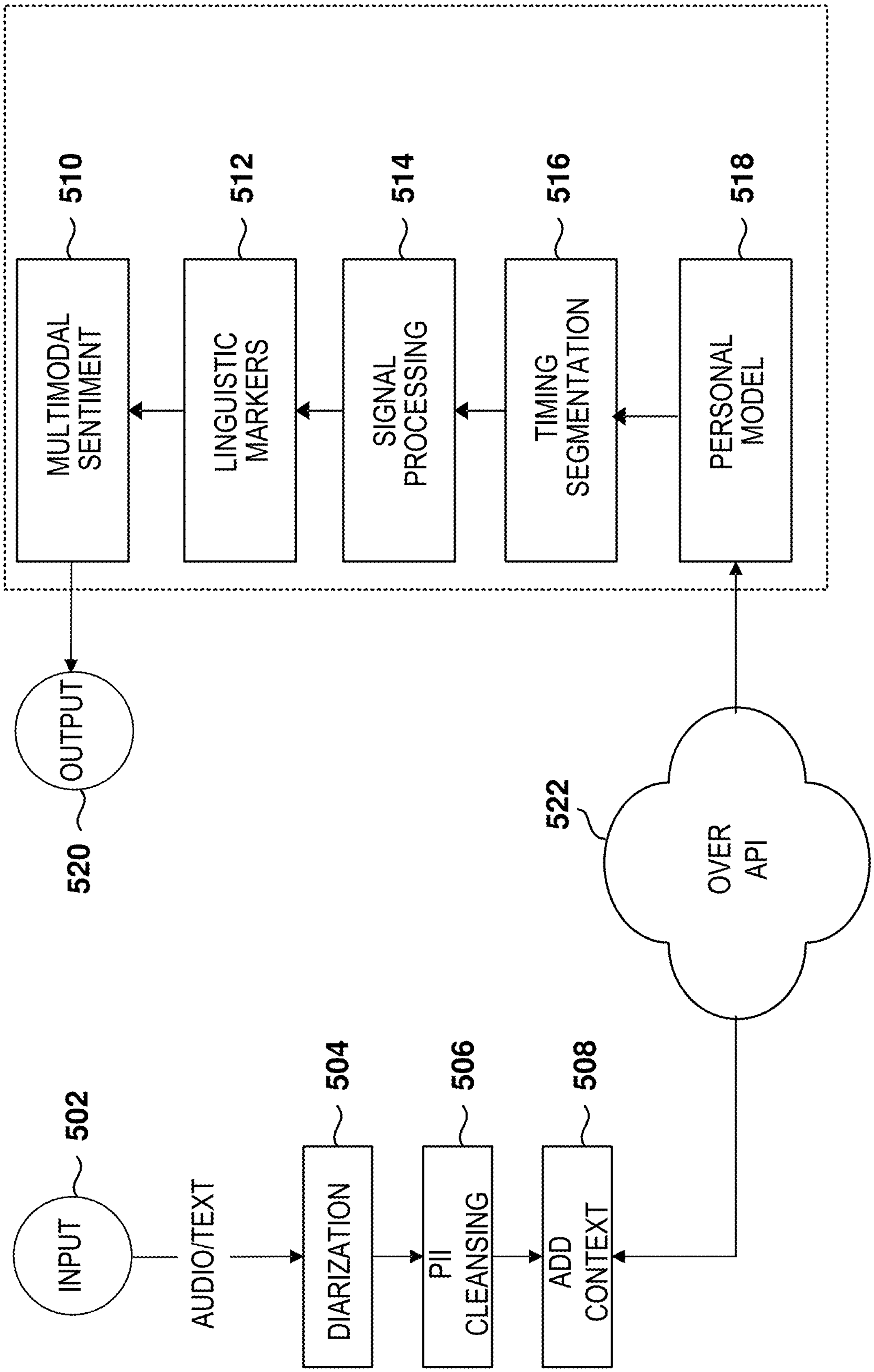
FIG. 5 shows a process for semantic extraction output from a raw audio or text input, illustrating the various stages involved in transforming the input into a meaningful output, according to some examples.

FIG. 5 shows a process for semantic extraction output from a raw audio or text input, illustrating the various stages involved in transforming the input into a meaningful output, according to some examples. The input 502 can be either audio or text. This input is first subjected to diarization 504 to separate individual speakers into distinct channels and timestamps the conversation, ensuring that the dialogue is accurately attributed to the correct participants.

The outcome of diarization involves the process of turn-taking discussed previously, resulting in a compilation of all the speech present in the conversation, each accompanied by timestamps.

Following diarization 504, the input undergoes PII cleansing 506 to remove personally identifiable information, thereby ensuring privacy and compliance with data protection regulations.

The concept of Personally Identifiable Information (PII) is relevant during the training process. The PII contains substantial data; for instance, in verbal communication, the inclusion of a name within a sentence may alter the sentence's meaning considerably. Other varieties of PII can similarly influence meaning.

SMLTalk preserves the context of the spoken PIT while maintaining privacy. SMLTalk substitutes the PII with a generic equivalent. For example, an actual name is replaced with a signal indicating that it is a name, allowing the model to understand its intended function and how such a pronoun or PII could affect meaning.

The process then adds context 508, which involves incorporating relevant historical conversation data to provide a richer understanding of the current interaction. Context from the chat history, encompassing all respective conversational exchanges, such as various turns with the model that have occurred prior, is incorporated. In instances where the user has engaged with the model over several entries, such as in the fourth, fifth, or sixth exchanges, previous interactions are included. This ensures the model retains some understanding of previous discussions. This context allows SMLTalk to interpret the input within the broader scope of previous exchanges.

The processed input is then transmitted over an API 522, which serves as a conduit for integrating the input with various analytical modules.

The personal model 518 is employed to tailor the system's response to the individual user. This model is fine-tuned based on the user's past interactions, preferences, and specific needs, ensuring that the output 520 is not only accurate but also personalized.

The process involves accessing the API and subsequently personalizing the model. Personalizing involves utilizing a fine-tuned model that is specifically trained for the user within the system. Common AI implementations often employ retrieval-augmented generation, which functions similarly to a database of context, such as a textbook or comparable source. A limitation of this approach is that it assigns nearly identical weights to all information. Indeed, the information from three years ago retains the same relevance as the present information. The approach diverges by emphasizing elements that constitute notable parts of a conversation. For instance, this could include scenarios where a student comprehends multi-factor multiplication due to an analogy that clarifies the concept.

The provided information is utilized to refine the model. The user receives an AI model that is customized specifically for the user rather than a generalized model for all users. The distinct element of this process is its automated nature. Many companies do not widely conduct fine-tuning models due to their laborious nature. The process implemented involved recognizing semantic importance within semantic markup, leading to its incorporation in the fine-tuning process.

Timing segmentation 516 breaks down the audio into precise segments based on timing, which aids in understanding the emphasis and pacing of the spoken words. This segmentation allows the capture of the nuances of spoken language accurately.

Timing segmentation involves the detailed analysis of audio, focusing on millisecond precision to ascertain the exact instances of pauses and statements. For instance, during timing segmentation, the phrase "I really do not understand that" may be used. Transcribing "I really do not understand that" into written text might strip away the nuances inherent in the spoken delivery. The inclusion of timestamps provides insight into context, revealing the emphasis placed on particular words. The elongated duration of the word "really" indicates that it was stressed more than is customary, offering a deeper understanding of the speaker's intent.

During signal processing 514, the audio waveform is analyzed to extract features like volume, pitch, and intonation. These features provide additional context that can influence the system's understanding of the input.

Signal processing involves the examination of volume, pitch, and intonation. This process entails analyzing the audio waveform itself, akin to observing the form's image, to determine the elements that can be extracted from the emphasis placed on specific words. Signal processing receives sound as input and assigns labels, such as intonation, to it. Also, in some examples, SMLTalk examines a sound wave to identify regions of higher volume and to determine aspects such as pitch. This information is available in the visual representation of the audio waveform itself.

Linguistic markers 512 are then added, which include identifying and labeling specific linguistic features, such as humor, anxiety, or sarcasm, which can significantly alter the interpretation of the input. The linguistic markers integrate relevant data, including the transcript, segmentation, and signal processing.

In some examples, the label is utilized within sentences to indicate that a specific sentence or word can vary based on emphasis. For instance, sometimes an entire sentence can be one word. Alternatively, it might consist of a word, a sentence, a paragraph, or even a conversation. It involves placing a linguistic marker, and in some cases, several may be necessary. Multiple sentences or terms may be examined to ascertain a particular aspect. This could encompass an entire paragraph or conversation.

The multimodal sentiment 510 evaluates the emotional tone of the input by considering multiple modes of communication, such as text, audio, and potentially visual cues. The system performs labeling on behalf of the user, categorizing elements as humor, anxiety, or other potential classifications. The system annotates the text accordingly.

Multimodal sentiment refers to the concept of integrating multiple modes of communication. It involves the simultaneous evaluation of various actions performed by the user, which may include spoken language, written text, and visual images. This approach aims to encompass the entirety of the interaction. It functions as a wrapper, integrating all elements of the interaction and providing an overall perception of the conversation. This framework is characterized as a wrapper that consolidates disparate components and assesses the conversation based on the aggregated information.

For instance, consider a scenario in which an individual articulates the sentence "I am fine." In its literal transcribed form, this statement would denote "I am fine." However, the interpretation is influenced by various factors, such as the change in pitch, the manner of articulation, and the emphasis on the words, which collectively contribute to the multi-modal sentiment. This sentiment encompasses the comprehensive interpretation of the statement, integrating several elements. These elements include personalization, time segmentation, signal processing, and various markers. The integrated result forms an opinion that indicates the intended meaning of the statement and suggests potential responses to it.

The output 520 represents the result of the process, delivering a response that is informed by the comprehensive analysis and contextual understanding achieved through the preceding operations.

SMLTalk implements a two-model conversational AI architecture featuring an LLM (tasked with high-level language generation and knowledge retrieval) and the smaller companion model Intuition trained on timestamped annotated conversation data.

The Intuition model dynamically produces contextual instructions or overlays that shape the primary LLM's responses, addressing multi-turn memory, emotional awareness, and time-based reasoning.

The solution includes:

- A dedicated companion model trained on one-to-one, timestamped conversations with emotional tagging and user intent annotations. The companion model maintains turn-by-turn context and monitors elapsed time to detect user impatience or conversation branching.
- Contextual overlay generation: the companion model outputs a structured summary or directive (e.g., JSON-like or tag-based) that highlights user emotional states, task goals, or relevant conversation history. This directive is passed to the primary LLM along with the user's latest query.
- Real-time turn coordination: upon each user utterance, the companion model updates its internal state, referencing timestamps, prior emotive states, and conversation goals. The primary LLM receives these updated overlays, ensuring each response is time-aware and contextually aligned.
- Adaptive dialogue management: the companion model can escalate or de-escalate conversation focus based on detected user frustration (e.g., "User has repeated the same question three times in the last 2 minutes") and supports domain-specific tasks like error analysis or scheduling by injecting instructions into the primary LLM's prompt or hidden state.

Some of the advantages of the solution include:

- Enhanced conversation flow: the smaller model's focus on turn-taking, emotional shifts, and timestamps leads to more coherent multi-turn dialogues;
- Reduced token overhead: instead of feeding the entire conversation history back into the LLM each time, a concise overlay from the companion model preserves context;
- Customizable training: the companion model can be retrained or tuned on domain-specific interactions, improving adaptability without retraining the large model; and
- Scalable architecture: SMLTalk can handle extended dialogues by offloading local context tracking to the smaller model, keeping the LLM's input more streamlined.

In one example, SMLTalk comprises a primary LLM and the companion model Intuition. In some examples, the LLM is a large neural network trained on a vast corpus of textual data that specializes in natural language generation and broad knowledge retrieval.

In some examples, the companion model is a smaller neural network primarily trained on one-to-one dialogues with timestamps, emotional tags, and user-intent annotations. The companion model focuses on turn-level reasoning and temporal or emotional state tracking.

One process to implement the solution includes the following operations:

- User input arrives (text or voice-transcribed text).
- The companion model processes the input in the context of prior conversation history, referencing timestamps to understand how much time has passed, whether the user repeated themselves, or if new emotional cues have emerged.
- The companion model outputs a structured overlay (e.g., JSON: {"emotional_state": "frustrated", "context_summary": "User tried factoring but is stuck", "time_since_last_query": "2 min"}).
- The primary LLM receives both the user's new utterance and the overlay, generating a final response.
- The response is returned to the user, and both the companion model state and LLM memory pipeline are updated.

The companion model is trained on curated, timestamped conversation datasets annotated with speaker intent, emotional states, and conversation turn IDs (as disclosed in Patent 1). Additionally, it learns to interpret time intervals (Patent 2) for advanced temporal reasoning.

In some examples, SMLTalk comprises:

- A turn memory encoder: an RNN or transformer-based network that ingests the last few user and system utterances, including timestamp features and emotion tags;
- A context summarizer: a module that generates a condensed representation of the user's immediate problem, emotional tone, and relevant domain context; and
- An instruction generator: produces high-level directives or "tips" for the primary LLM, e.g., "Offer a step-by-step factoring approach" or "Acknowledge user frustration."

The companion outputs may be delivered as structured text with key-value pairs or hidden embeddings that embed the needed context in vector form, which the LLM can parse if it is trained to do so.

When the LLM is about to generate a response, the companion model's overlay is inserted into the LLM's input. This can occur via one or more of the following:

- A system prompt: the overlay is prepended in the LLM's system-level instructions (e.g., "User is frustrated and wants factoring help . . . ");
- Inline tags: if the LLM can interpret structured tags, the overlay is appended to the user query in a specialized format; or
- An input received via an API: The LLM and companion model communicate through an orchestration layer that merges their outputs before inference.

In some examples, the companion model runs synchronously with user queries, generating overlays each turn. In other scenarios (e.g., batch processing or slow user engagement), updates to the overlay can happen asynchronously when certain thresholds (time gap, repeated confusion) are triggered.

In one example, a user requests help factoring a polynomial, e.g., "I tried factoring $x^2-4x-5x^2-4x-5$ again. Can you see where I went wrong?"

The companion model checks timestamps (e.g., the user asked a similar question 3 minutes ago, no LLM solution seemed to fix it), Notices "user frustration" from repeated requests; and generates an overlay, e.g., {"emotional_state": "frustrated", "recent_repeats": 2, "requested_task": "factor checking" }.

Afterward, the user's query and the overlay are sent to the LLM as an input prompt. The LLM response provides a more detailed step-by-step factoring approach, acknowledging the user's frustration and allowing the system to return this enhanced response to the user.

Other applications include:

Customer Service: the companion model tags user sentiment (e.g., "User is calm," "User is upset about delays"). The LLM tailors answers to show empathy or expedite escalation.

Healthcare: extended dialogues over days or weeks benefit from the companion model's memory of prior check-ins (timestamp-based) and emotional fluctuations (anxiety, urgency).

Education: the companion model tracks student progress across multiple tutoring sessions, generating contextual overlays for each new question.

Figure 6:
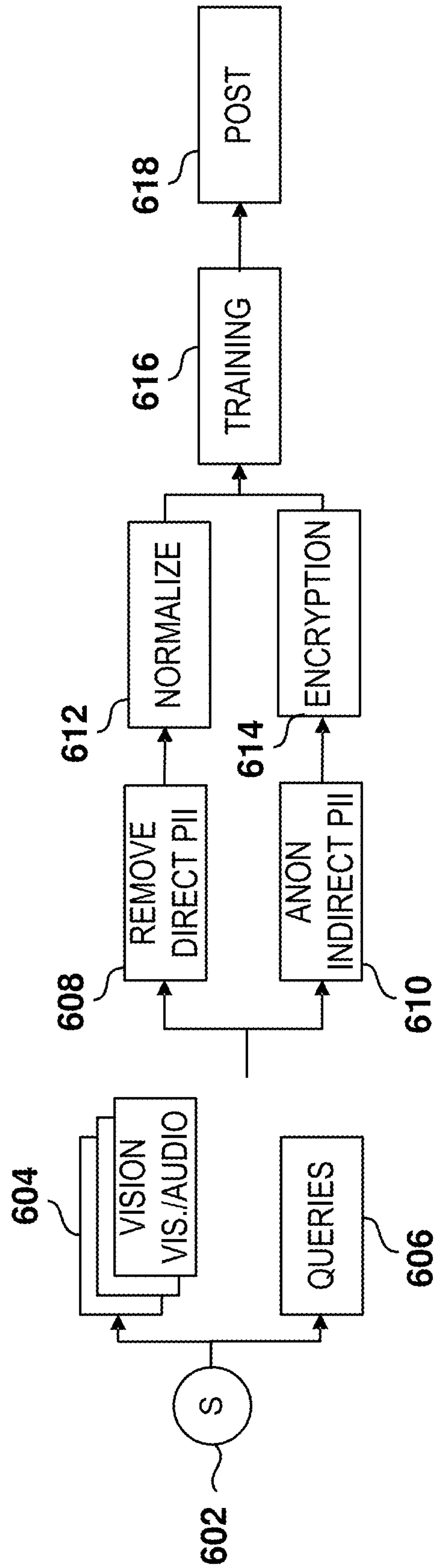
FIG. 6 shows a process for preparing data for training a model, focusing on the cleansing and normalization of data to ensure privacy and enhance the quality of training inputs, according to some examples.

FIG. 6 shows a process for preparing data for training a model, focusing on the cleansing and normalization of data to ensure privacy and enhance the quality of training inputs, according to some examples.

The input 602 is processed through both modules for vision or vision and audio 604, and queries 606. These components are responsible for handling visual and audio data, as well as textual queries, respectively, and are designed to operate through separate pipelines to manage different data types effectively.

At operation 608, the PII is removed to ensure data privacy by eliminating sensitive information such as names, phone numbers, and student IDs from the dataset. From operation 608, the pipeline continues to normalize 612 the data to ensure consistency across the dataset.

On the second pipeline, at operation 610, the indirect PII is anonymized, which involves anonymizing data that could indirectly identify individuals, such as age, ethnicity, and location. This operation ensures that even non-explicit identifiers are managed to maintain user privacy. This operation includes annotation tasks (e.g., text, exams, and responses) and aims to prevent bias by balancing the data. Encryption 614 is applied to secure the data, employing techniques like pseudonymization and hashing to protect against low entropy and rainbow table attacks.

The pipelines converge at operation 616 for the training. The operation 616 includes preprocessing tasks such as data splitting, semantic paraphrasing, and feature weighing, which are necessary for optimizing the data for model training. Operation 618 is the post-training phase, which includes reinforcement learning from human feedback (RLHF), super alignment, monitoring, and deployment. This phase ensures that the trained model aligns with predefined safety and performance standards before deployment for use.

FIG. 7 shows a system for extracting semantic cues from audio, focusing on high-resolution audio capture and timestamping, according to some examples.

The waveform 702 represents the raw audio data captured from live conversations. The fine-grained segmentation represents an advancement in the system, enabling the precise segmentation of audio at the millisecond level. This segmentation allows the system to timestamp each word or phoneme accurately, capturing subtle changes in speech, such as pauses, stress patterns, and rapid fluctuations.

The timestamps assist in the mapping of specific moments in the conversation, which can reveal underlying semantic cues that are not apparent in the text alone. The fine-grained segmentation detects nuances in speech that contribute to the overall understanding of the conversation. For instance, a drawn-out word with a noticeable pause can indicate hesitation or irony, providing context that enhances the interpretation of the conversation beyond the literal text.

This additional information and detail are beneficial for applications involving large language models (LLMs), as the segmentation enriches the training data with contextual information that improves the model's ability to respond appropriately in real-time interactions.

Existing conversational AI models, such as Large Language Models (LLMs), often treat dialogues as linear sequences of text without a robust mechanism for handling the passage of real-world time. References like "yesterday," "five minutes ago," or "tomorrow" are typically interpreted as mere tokens rather than points on a temporal axis. Consequently, the system's capacity to recall and process events in the correct chronological order is limited.

While session-based memory (e.g., storing previous user queries) can partially address multi-turn interactions, most systems fail to:

Quantify elapsed time between consecutive user turns (e.g., an hour versus a day);

Prioritize urgent or time-sensitive requests (e.g., "I asked you this 10 minutes ago, are you still there?"); and Handle dynamic or extended conversations (e.g., returning after a week with new information).

These limitations confuse user interactions and degrade performance on tasks requiring temporal references, such as scheduling, follow-ups, or multi-day instructions.

A specialized approach to timestamp encoding, where each user utterance is associated with an absolute or relative timestamp, combined with temporal reasoning methodologies, allows conversational AI systems to intelligently track the passage of time, handle references to prior sessions, and respond with contextually appropriate detail about temporal events.

The solution includes systems and methods for timestamp encoding and temporal reasoning within conversational AI. By embedding precise timestamps and derived time-based features into the conversation stream (and optionally leveraging a smaller "companion model" Intuition), the solution enables robust multi-turn understanding, continuity, and context retention.

The solution includes the following:

Timestamp normalization and encoding: each user utterance is tagged with a high-precision timestamp (e.g., ISO 8601 format). A normalization process converts absolute time values into relative intervals, such as time elapsed since the user's last interaction or time until a future deadline.

Temporal feature extraction: SMLTalk computes features like time gaps, conversation duration, daily or weekly recurrence of topics, and urgency indicators (e.g., short time between utterances implies urgency).

Temporal reasoning logic: a temporal engine or a companion model can interpret references like "yesterday," "last Wednesday," or "two days ago" by comparing the user's utterance timestamp with previously stored timestamps. SMLTalk can infer time-based conditions (e.g., "If the user hasn't received a response for more than 24 hours, escalate the urgency tag").

Integration with Multi-Turn Dialogue Memory: timestamps interoperate with a memory pipeline that sequences conversation turns across hours, days, or weeks. SMLTalk can retrieve or summarize relevant context from a prior turn if it falls within a specified time window (e.g., "Recall the conversation from 10 minutes ago about factoring polynomials.").

Adaptation to Companion Model (Intuition): a specialized, smaller model may incorporate these temporal features to produce semantic hints for a primary LLM, indicating the user's potential impatience, confusion, or time-driven requests.

Some of the advantages of this solution include:

Enhanced continuity: conversations that span multiple sessions or days retain coherent references to past events;

Improved user experience: timely re-engagement, acknowledgment of waiting periods, and correct interpretation of "yesterday" or "last session;"

Context-aware prioritization: time-based logic can automatically escalate important or overdue tasks; and Domain versatility: broad applicability for scheduling, tutoring, customer support, or health monitoring scenarios requiring time-tracking.

The solution processes and leverages timestamps to enable advanced temporal reasoning in conversational AI.

Temporal reasoning refers to the process of understanding, interpreting, and reasoning about time-related information within a given context. In the realm of artificial intelligence and natural language processing, temporal reasoning involves the ability to handle and make sense of temporal expressions, such as dates, durations, and time intervals, as well as to understand the sequence and timing of events. This capability allows systems to process and respond to time-sensitive information accurately, manage chronological order, and make decisions based on temporal constraints or conditions. In conversational AI, temporal reasoning is crucial for maintaining context over multiple interactions, scheduling tasks, and interpreting references to past or future events.

Each incoming utterance from a user or system is tagged with a raw timestamp (e.g., 2025-01-10T14:05:32Z) obtained via the client device or server logs. In some examples, multiple time sources (e.g., local user time vs. server time) are reconciled through a synchronization mechanism.

A normalization engine converts absolute timestamps into relative or duration-based features:

Time since the last turn (e.g., 52 seconds or 3 days);

Session start or end;

Time of day (morning, afternoon, night); and

Time-window buckets (e.g., "under 10 minutes," "over 1 hour," "previous day," etc.)

The data structures for time-related data can be appended in a structured format, such as JSON. For example:

json

Copy code

{
"turn_id": 7,
"speaker_id": "User_123",
"timestamp_utc": "2025-01-10T14:05:32Z",
"time_since_last_turn_see": 52,
"session_day_of_week": "Tuesday"
}

This data is then fed into subsequent modules for higher-level reasoning.

The temporal reasoning logic includes lexical mapping of time Expressions. Utterances containing phrases like "yesterday," "this morning," or "two weeks ago" are parsed. A dictionary or ML-based parser translates these references into approximate or exact timeline points relative to the current timestamp. For example, if the current time is 2025-01-12T12:00:00Z, "yesterday at 3 PM" maps to 2025-01-11T15:00:00Z.

Further, the temporal reasoning logic includes time comparison and escalation. The SMLTalk system checks whether an event has passed or is upcoming. If a user's request references a past-due event (e.g., "I ordered this 3 days ago"), SMLTalk could add an "overdue" or "escalate" tag. Further, if the user says, "Remind me tomorrow," the system marks a future time checkpoint for follow-up.

The temporal reasoning logic also includes time-based summaries. For extended dialogues, the system (or a companion Intuition model) may generate a summary that highlights relevant points based on how recently they were discussed. Example: "The user last mentioned factoring polynomials 2 days ago, with partial progress."

The interaction with the memory pipeline includes multi-session linking and time-gated context retrieval. When the user returns after hours or days, the system searches the memory pipeline to find the conversation timestamp range matching the user's last session. By referencing previously stored timestamps, the system gracefully resumes the dialogue at the correct context point. If a conversation or session times out after a preset duration (e.g., 20 minutes of inactivity), the system can decide to store that segment as "Session End." When the user returns, a new session begins, but the old session's context is still accessible in the pipeline, annotated with its ending timestamp.

The integration with the companion ("Intuition") model includes time-aware feature input, semantic overlay, and prompt guidance. The smaller companion model, Intuition, may consume the normalized timestamp data and derived time features. For instance, it can learn patterns such as "If a user waits more than 5 minutes for a response, they are likely to be frustrated or impatient."

The Intuition model can generate hints for the primary LLM, e.g., "User reconnected after 2 days. Summarize prior conversation and check for changes;" and "User responded within 10 seconds. Possibly still engaged, no summary needed."

Some example use cases include:

Educational tutoring: students returning daily to practice math problems benefit from session continuity. The system's time tracking helps identify gaps (e.g., 24-hour intervals) that might indicate a need for review or recap.

Customer support: a user who references a support ticket from "last week" triggers the system to fetch logs from 7 days prior. The system can detect if the user's waiting period was unreasonably long and escalate accordingly.

Healthcare: patients might interact with a healthcare chatbot over weeks. Timestamps ensure the AI references prior instructions accurately and checks if medication follow-up is overdue.

FIG. 8 shows phoneme-level analysis and prosody extraction, which play a role in understanding the nuances of spoken language beyond mere text transcription, according to some examples.

SMLTalk is designed to enhance the interpretation of audio inputs by analyzing various acoustic features and identifying linguistic markers, thereby providing a richer semantic context.

The signal processing for acoustic features involves analyzing the underlying audio waveform to extract phonetic details such as pitch, volume, duration, and intonation contours. These features are important as they form the building blocks of prosody, which refers to the rhythm and sound patterns of speech. By focusing on these acoustic features, the system can discern the emotional and empathetic elements of speech that are often lost in basic speech-to-text conversion.

Linguistic marker identification is achieved using specialized natural language processing algorithms that are enhanced with audio-derived metadata. The system tags segments of speech with semantic markers based on the acoustic features identified. For example, a rising intonation combined with a quick pace might be labeled with markers such as "question" or "curiosity. Conversely, a flat, monotone delivery might be tagged with "disappointment" or "sarcasm," suggesting a lack of enthusiasm or a sarcastic undertone.

An example is a scenario where a speaker says, "Oh, great . . . " with a flat tone and a slight drop in pitch. SMLTalk uses both the timestamps and prosodic analysis to attach a tag such as "sarcasm." This tag, which is not available in plain text, provides a richer semantic context, allowing for a more accurate interpretation of the speaker's intent and emotional state. This capability is significant as it enables the system to understand and respond to the subtleties of human communication more effectively.

FIG. 9 shows an integrated sentiment analysis system that combines text-based sentiment analysis with audio features to provide a comprehensive evaluation of emotional tone, according to some examples.

SMLTalk is designed to assess vocal stress, changes in pitch, and rhythm, thereby offering a dual analysis that results in a multidimensional sentiment profile for each segment of the input data. The multimodal sentiment evaluation component plays a role as the component merges traditional text analysis with audio cues, which are often overlooked in conventional sentiment analysis.

By incorporating audio features, the system can detect subtleties in vocal expression that text alone might miss. This includes variations in pitch, which can indicate different emotional states, and rhythm, which can suggest the speaker's level of stress or urgency.

An example is a scenario where a user might say, "I'm fine," which typically conveys a positive sentiment. However, if the audio analysis reveals a downward pitch and a slower speech rate, the system might interpret this as a sign of "understated distress." This nuanced sentiment cue ensures that the emotional context is preserved even when the data is converted into text, allowing for a more accurate understanding of the speaker's true emotional state. The significance of this integrated approach lies in the ability to enhance the accuracy of sentiment analysis by considering both verbal and non-verbal cues. This is particularly important in applications where understanding the full emotional context is of great importance, such as in customer service interactions, mental health assessments, and human-computer interaction scenarios. By providing a more comprehensive view of sentiment, the system can improve the quality of responses generated by AI systems, making these responses more empathetic and contextually aware.

FIG. 10 shows the design of SMLTalk to enhance AI responses through the integration of a companion module, which operates in parallel with the primary language model, according to some examples.

The dual system architecture allows the primary model to handle general conversation processing while the companion module continuously ingests semantic cues from audio inputs. This architecture ensures that the AI system is not only processing textual data but is also enriched with additional semantic information, improving the overall understanding and response generation capabilities through real-time monitoring and dynamic prompt adjustments via reinforcement learning as well as a reinforcement and feedback loop.

The real-time monitoring component is responsible for dynamically analyzing shifts in sentiment, pauses, and linguistic markers within the audio input. This module generates real-time "hints" or supplementary context that can alert the main AI to nuances that might be missed if only pure text were considered. By consistently monitoring these elements, the system can provide more accurate and contextually relevant responses, enhancing the user experience by addressing subtleties in communication that are often overlooked by traditional language models.

Dynamic prompt adjustment via reinforcement learning is a sophisticated mechanism that employs reinforcement learning to adjust prompts dynamically based on detected cues. The contextual hint generation aspect of this component formulates additional instructions when specific cues, such as a sarcastic tone or heightened emotion, are detected. These instructions are then merged into the prompt for the primary AI, allowing the system to respond more appropriately to the user's emotional state.

For instance, if a user's tone suggests frustration, the module might add a hint like "User exhibits signs of frustration; consider a clarifying or empathetic follow-up," thereby guiding the AI to provide a more suitable response.

The reinforcement and feedback loop is a continuous process that compares the primary AI's responses against real-time user feedback. This loop plays a role in the system's adaptability, as it allows the companion module to re-evaluate and adjust future prompts based on the user's reactions. If a user's subsequent reply indicates that the response was off-target, the system can switch to alternative strategies, creating a dynamic, real-time fine-tuning loop where the model "learns" the conversational context on the fly. This feedback mechanism ensures that the AI remains responsive and relevant to the user's needs, continuously improving the AI's performance over time.

Figure 11:
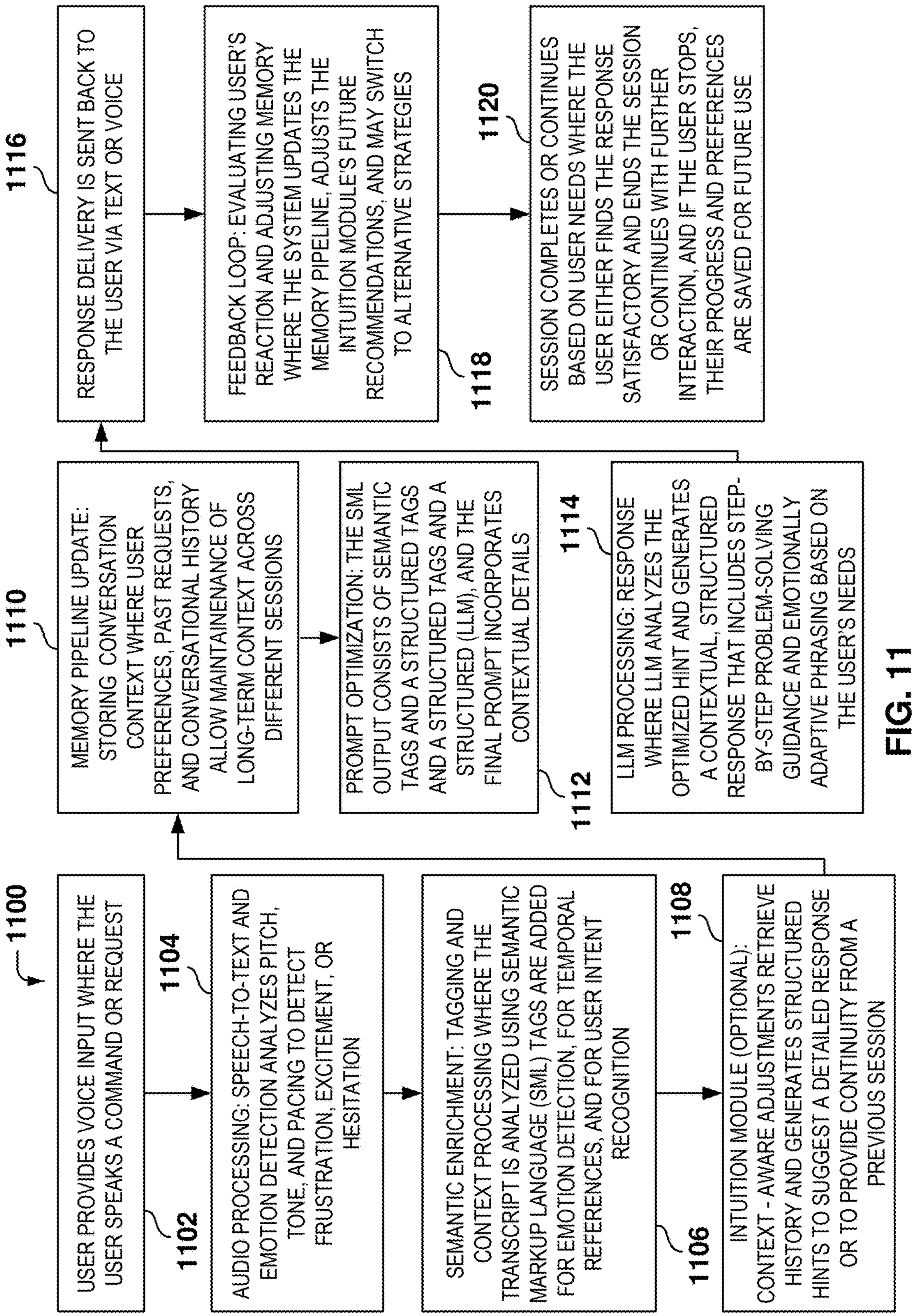
FIG. 11 shows a flowchart illustrating a method for processing voice input to generate a response using a large language model (LLM), incorporating feedback loops for continuous improvement, according to some examples.

FIG. 11 shows a flowchart illustrating a method 1100 for processing voice input to generate a response using a large language model (LLM), incorporating feedback loops for continuous improvement, according to some examples. While the various operations in this flowchart are presented and described sequentially, one of ordinary skill will appreciate that some or all of the operations may be executed in a different order, be combined or omitted, or be executed in parallel.

Once the audio is received, and after the execution of the PII protocols and the diarization process, the audio processing is conducted. The processing involves analyzing the words for pitch and various elements. The process then advances to the subsequent phase, referred to as semantic markup. This phase facilitates understanding of the different types of emotions present.

Hints are generated, and hints about the ongoing events are developed. Subsequently, a memory pipeline is implemented to store conversations and determine the placement of a particular conversation within the array of interactions this user has previously engaged in. The improvement introduced involves the creation of a memory pipeline. Each interaction with the LLM is tailored to the individual user, forming an integral component of an overarching system.

This prompt optimization involves generating the prompt with the additional information for the LLM. In some examples, at the beginning of the conversation, there is an initial SMLTalk prompt, e.g., "behave like a tutor." Subsequently, the objective is to modify the prompting with each individual message dynamically. For instance, consider a scenario in which the situation is proceeding effectively, and unexpectedly, the student exhibits emotional distress by crying and encountering significant difficulty. The response from the prompt engineer would indicate that the student is experiencing considerable difficulty with the issue. It would advise adopting an empathetic approach, moderating the pace of speech, and responding with empathy.

A feedback loop is established. Each response provided by the user and generated by the system constitutes an element of this feedback loop. The model accounts for this feedback loop, and the large language model (LLM) factors it into processing. For instance, a response may effectively assist a child in achieving a calmer state, or a response may prove ineffective, necessitating the consideration of alternative techniques. The process involves more than merely addressing a homework question; it encompasses evaluating the entire conversation and adjusting the model's response accordingly. This is an ongoing process of prompt engineering.

At operation 1102, the user provides voice input by speaking a command or request. This initiates the process of converting spoken language into a format that the system can process.

From operation 1102, the method flows to operation 1104, which involves audio processing. Here, the system performs speech-to-text conversion and emotion detection. In some examples, the analysis focuses on pitch, tone, and pacing to identify emotional states such as frustration, excitement, or hesitation. This operation creates data to understand the user's emotional context and tailor the response accordingly.

From operation 1104, the method flows to operation 1106, where semantic enrichment occurs. The transcript generated from the speech-to-text conversion is analyzed using SML. Tags are added to the transcript for emotion detection, temporal references, and user intent recognition. This operation enhances the understanding of the user's request by providing additional context and meaning.

At operation 1108, the method optionally engages the intuition module. This module performs context-aware adjustments by retrieving historical data and generating structured hints. These hints are used to suggest a detailed response or to provide continuity from a previous session, ensuring that the interaction is coherent and contextually relevant.

The method then advances to operation 1110, where the memory pipeline is updated. This operation involves storing the conversation context, including user preferences, past requests, and conversational history. The memory pipeline allows for the maintenance of long-term context across different sessions, enabling personalized interactions over time.

From operation 1110, the method flows to operation 1112, which focuses on prompt optimization. The SML output, consisting of semantic tags, is used to create a structured, optimized prompt for the LLM. This prompt incorporates contextual details, ensuring that the LLM has all the necessary information to generate an appropriate response.

The LLM processing occurs at operation 1114, where the LLM analyzes the optimized prompt and generates a contextual, structured response. This response includes operation-by-operation problem-solving guidance and emotionally adaptive phrasing tailored to the user's needs.

Once the response is generated, the method moves to operation 1116, where the response is delivered back to the user via text or voice. This operation completes the initial interaction cycle, providing the user with the requested information or assistance.

The method then enters a feedback loop at operation 1118, where the system evaluates the user's reaction and adjusts the memory pipeline accordingly. The Intuition module's future recommendations may be modified, and alternative strategies may be employed based on the feedback received. This continuous improvement process ensures that the system remains responsive and adaptive to the user's evolving needs.

At operation 1120, the session either completes or continues based on the user's needs. If the user finds the response satisfactory, the session ends, and their progress and preferences are saved for future use. Alternatively, the user may choose to continue the interaction, prompting further processing and response generation.

Figure 12:
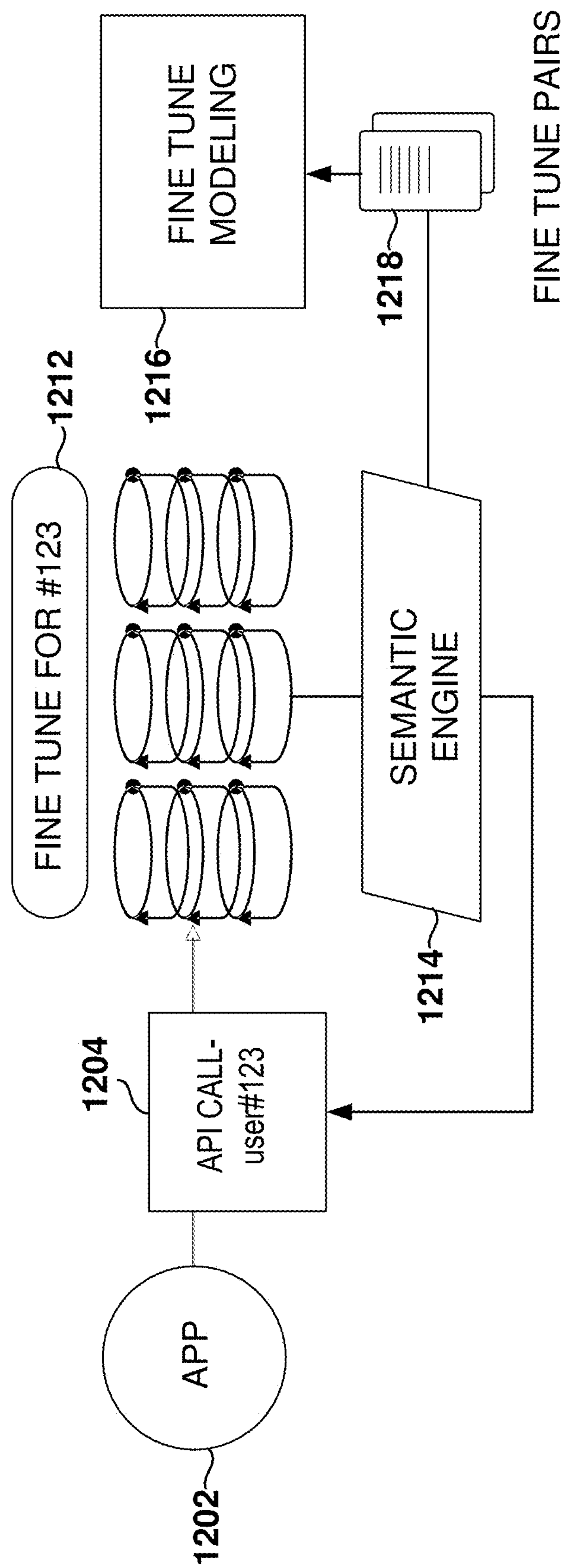
FIG. 12 shows the software architecture supporting the SMLTalk system on a computing platform, according to some examples.

FIG. 12 shows the software architecture supporting the SMLTalk system on a computing platform, according to some examples. In some examples, the SMLTalk architecture is composed of several interconnected components, including App 1202, API 1204, fine tune 1212, semantic engine 1214, and fine tune modeling 1216.

In the illustrated example, the request is received from a user identified as use #123. The app 1202 serves as the initial interface for user interactions, where users can input queries or commands. This app 1202 communicates with the API 1204, which is responsible for handling specific user requests and directing them to the appropriate processing modules.

The app 1202 makes a call to API 1204 for the user #123. Fine-tune 1212 is a specialized module that stores user-specific data and fine-tunes the LLM to cater to individual user preferences and requirements.

The semantic engine 1214 analyzes and interprets the semantic content of user inputs. The engine processes the data received from the API 1204 call-user #123 and enhances the data with semantic markup, which includes classifications such as emotion and intonation. This engine creates data to understand the nuances of user communication and ensure that the responses generated by the LLM are aligned with the user's intent. This module ensures that the system can provide personalized interactions by adjusting the model's parameters based on user-specific data.

The output of the semantic engine 1214 is fine-tuned pairs 1218, which are sets of input-output examples employed to train the model. These pairs assist in enhancing the model's performance by supplying structured data for learning and adaptation.

Figure 13:
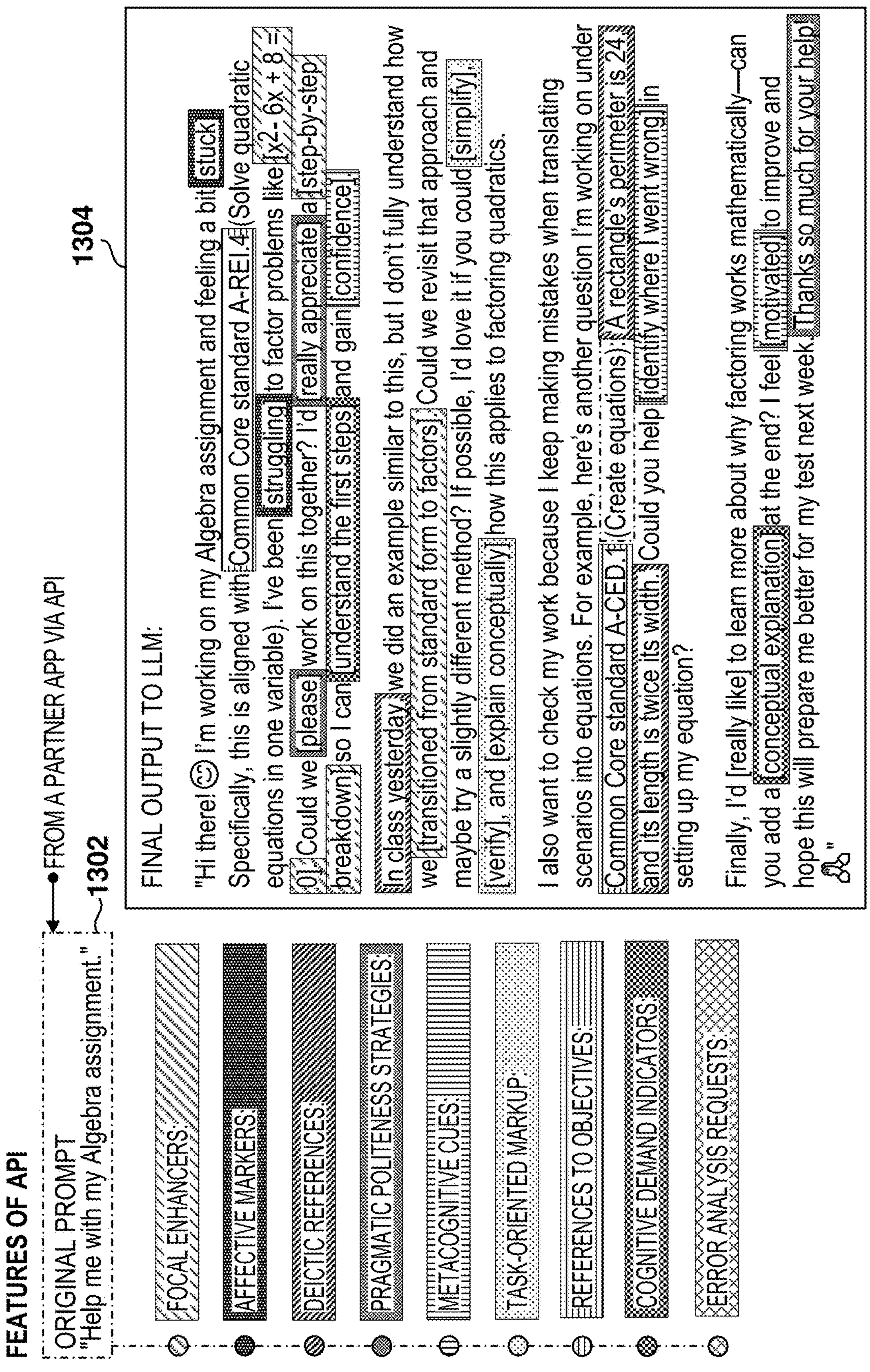
FIG. 13 shows the features of an API that facilitates the transformation of an original prompt into a final output suitable for the LLM, according to some examples.

FIG. 13 shows the features of an API that facilitates the transformation of an original prompt into a final output suitable for a Large Language Model (LLM), according to some examples. The figure illustrates the process starting from an input (e.g., prompt 1302) received from a partner application via the API, and culminating in the output 1304 from the LLM.

The API is designed to enhance the original prompt by incorporating various linguistic and cognitive elements that improve the clarity, relevance, and effectiveness of the communication with the LLM. These enhancements include focal enhancers (emphasize significant parts of the message to draw attention to important concepts or requests) and affective markers (used to convey the emotional tone of the message), helping the LLM to understand the user's emotional state and respond appropriately.

The enhancements also include deictic references to provide context by referring to specific times, places, or situations, thereby grounding the conversation in a particular context. Pragmatic politeness strategies are employed to ensure that the communication is courteous and considerate, which can play an important role in maintaining a positive interaction with the user. Metacognitive cues are integrated to reflect the user's awareness of their own cognitive processes, such as recognizing areas of difficulty or uncertainty. Task-oriented markup is used to clearly define the tasks or actions that the user is requesting, ensuring that the LLM can focus on delivering the desired outcomes.

Further, the enhancements include references to objectives to align the conversation with particular goals or standards, such as educational benchmarks, which can guide the Language Learning Model (LLM) in providing responses that are relevant to the user's aims. Cognitive demand indicators highlight the level of cognitive effort required by the user, allowing the LLM to tailor responses to match the user's capabilities. Further, error analysis requests are incorporated to prompt the LLM to identify and address potential errors in the user's understanding or approach, facilitating a learning process that is both corrective and constructive. The combination of these features in the API ensures that the output to the LLM is not only informative but also supportive and aligned with the user's needs and context.

In the illustrated example, the original prompt 1302, "Help me with my algebra assignment. The output 1304 is the following:

"Hi there!I'm working on my Algebra assignment and feeling a bit [stuck]. Specifically, this is aligned with Common Core standard A-REI.4 (Solve quadratic equations in one variable). I've been [struggling] to factor problems like [$x^2-6x+8=0$]. Could we [please] work on this together?I'd [really appreciate] a [step-by-step breakdown] so I can [understand the first steps] and gain [confidence].

"In class yesterday, we did an example similar to this, but I don't fully understand how we [transitioned from standard form to factors]. Could we revisit that approach and maybe try a slightly different method? If possible, I'd love it if you could [simplify], [verify], and [explain conceptually] how this applies to factoring quadratics.

"I also want to check my work because I keep making mistakes when translating scenarios into equations. For example, here's another question I'm working on under Common Core standard A-CED.1 (Create equations): 'A rectangle's perimeter is 24, and its length is twice its width.' Could you help [identify where I went wrong] in setting up my equation?

"Finally, I'd [really like] to learn more about why factoring works mathematically—can you add a [conceptual explanation] at the end?I feel [motivated] to improve and hope this will prepare me better for my test next week. Thanks so much for your help!"

In one example in the area of education, the App provides AI-driven reading assessments and coaching to help students improve literacy. The benefit of the solution is emotional clarity in young readers. Children often express frustration or confusion not in clearly stated queries but in tones, hesitations, or complaints. Intuition detects emotional cues, even sarcasm, from spoken questions like "I love this story" or "This word is too hard" and converts them into actionable prompts with past context for the primary LLM. Instead of just delivering a definition, the system responds with references to previous conversations and progress.

If a child sounds hesitant, Intuition can help the primary LLM choose a more patient, step-by-step explanation based on past successful interactions. For example, it might reframe "I don't get this!" into "The student is stuck on the pronunciation of [specific word]. Provide a gentle breakdown."

A child may say, "I love this story." This statement may be an example of sarcasm and may not reflect the child's genuine sentiment. A model might inaccurately interpret this statement as genuine enjoyment and respond affirmatively, but this does not align with the true situation. In such scenarios, supplementary information is provided, such as when a student encounters difficulties with the pronunciation of a particular word. A gentle deconstruction is offered to address this issue. Interpretation of the student's communication involves understanding the intended meaning, which may differ from the literal linguistic content presented. This approach facilitates interaction with models.

SMLTalk employs reinforcement learning through the analysis of user interactions. For instance, hints are provided, and user responses are observed. If a response is positive, such as an indication of understanding, this information is incorporated as a tuning set for a fine-tuning model. As a result, an AI model is fine-tuned for each individual user. Rather than utilizing a singular model applicable to all users, unique fine-tuned models are developed for every user within the system. The pre-processing component requires particular attention. It is insufficient to use the text from a conversation alone. Diarization is necessary to ensure that individual speakers are distinguished, and time-stamping is added to capture the timing of conversations accurately.

Semantic markup is also added, appearing in brackets similar to HTML tags, indicating elements such as sarcasm, humor, or frustration. Additional information is incorporated directly within the text itself.

The process entails performing what is referred to as a conversational string. For instance, consider an array item: one individual says "hello," and another responds with "hello." Multiple events may occur, all constituting part of the same conversation. Each line item included in the training may vary in length. However, all line items share the concept of a single-idea conversation. It is beneficial to provide the model with the complete conversation in order to facilitate understanding of turn-taking, as the model cannot predict subsequent turns without it. In some examples, training encompasses the entire conversation length.

SMLTalk employs a novel methodology involving training on audio rather than relying on text, which lacks the multidimensional qualities inherent in voice. The conceptual framework of the model entails applying comprehensive pre-processing techniques, focusing on diarization, to align audio with corresponding words. This process aims to extract embedded features from audio waves for use as pairs in subsequent analysis. The model can then undergo training through various approaches, contingent upon the availability of these audio-text pairs. Furthermore, the model advances by aligning with prosodic elements, which is the foundational basis for training.

Prosody refers to the patterns of rhythm, stress, and intonation in speech. It encompasses various elements such as pitch, loudness, tempo, and rhythm, which collectively contribute to the expressiveness and emotional tone of spoken language. Prosody helps convey meaning, indicate questions or statements, express emotions, and enhance the overall communicative intent of the speaker. It plays a crucial role in effective communication and can vary significantly between different languages and dialects.

The concept of test-time computing involves training the model during live inference. Traditionally, models analyze input and generate an output. Multiple outputs are possible, which provides historical context for subsequent inputs. In conversational engagement, the model's prediction may extend beyond the immediate response, encompassing the entire conversation trajectory. The model is capable of forecasting not only the immediate response but also predicting the progression over multiple interactions, potentially outlining predictions for the subsequent five turns.

Optimization is focused on enhancing the user experience during the precise moment of interaction. The model is designed to adjust to the current conversation rather than relying on a broader context. The model has undergone training with a comprehensive set of heuristics and structures, clarifying the meaning of various tags. For instance, an eye tag signifies a change in scene, indicating a shift in the conversation topic. This understanding allows for recognition that, although remaining within the same time frame, the subject of discussion has now changed, reflecting the user's transition to a different topic.

In some examples, the process involves providing the model with a set of code as a type of prompt or hint, as opposed to conversational input. The model has been trained to interpret this code. Additionally, there is a component of real-time computation due to the existence of a nested language structure. For instance, there exists a conversation layer with which timestamps and other elements have been encoded. The comprehensive training of the model has incorporated these timestamps and all relevant semantics. Consequently, the model has acquired the capability to interpret a language that is not English. It has learned to comprehend a coding language introduced during the conversation.

One example is for the Sample API Hint Output. Turns signify a change in speaker. In this example, there are only two speakers. Timestamps provide the exact length of the speech. The speaker identifies who is taking the turn. Additionally, we may wish to add sentiment and semantic markup to the hint output. Here is an example sequence: Input:

```
1
00:03:24,766- ->00:03:26,693
Speaker 1: Really crushed the math test. Was late and
  wasn't prepared.
Output:
2
00:03:24,766- ->00:03:26,693
Hint: Phrasing carries a negative sentiment about perfor-
  mance, marked by terms like "crushed." Indicate dis-
  appointment and criticism. Respond with "That's
  tough" and wait for more from the user.
```

Thus, the timestamps are created, and the hint is generated.

Another example is for parsing a transcript. The provided file is in SRT format, which already includes timestamps. SMLTalk parses it using a script to isolate timestamps, dialogue lines, and contextual annotations. An example of the generated Python Script for Parsing is the following:

```
import re
def parse_srt(file_path):
    with open(file_path, "r") as file:
        content=file.read( )
    #Regex pattern to match SRT entries
    pattern=r"(\d+)\s+(\{2}:\d{2}:\d{2},\d{3})- ->(\d{2}:
      \d{2}:\d{2},\d{3})\s+(.+?)\s+(?=\d+\s+\d{2}:
      \d{2})"
    matches=re.findall(pattern, content, re.DOTALL)
    subtitles=[ ]
    for match in matches:
        index, start_time, end_time, text=match
        subtitles.append({
            "index": int(index),
            "start_time": start_time,
            "end_time": end_time,
            "text": text.replace("\\n", " ")
        })
    return subtitles
#Example usage
subtitles=parse_srt("Forrest Gump copy.txt")
for subtitle in subtitles[:5]: #Print the first 5 subtitles
    print(subtitle)
```

This text provides an example of parsing a transcript by employing specific code to perform the operation. The process includes computational elements and is not limited to a language model. A server is engaged to execute mathematical computations in conjunction with the language model's operations. These computations occur simultaneously and are based on the provided information. This information is subsequently integrated into the conversation thread.

In some examples, the tool Spacey is used. If the script contains complex interactions, Natural Language Processing (NLP) can help. First, a simple speaker classification model is trained using a pre-labeled dataset to train a text classification model to predict speakers. For training data, label a subset of the transcript manually.

Then, the pre-trained model is used for entity recognition. Models like SpaCy or Hugging Face Transformers can detect names and associate them with dialogue.

One example with SpaCy generates the following code:

```
import spacy
nlp=spacy.load("en_core_web_sm")
def identify_speakers_with_nlp(subtitles):
    for subtitle in subtitles:
        doc=nlp(subtitle["text" ])
        if any(ent.label_=="PERSON" for ent in doc.ents):
            subtitle["speaker" ]=[ent.text for ent in doc.ents if
              ent.label_=="PERSON" ][0]
        else:
            subtitle["speaker" ]="Unknown"
return subtitles
#Example usage
nlp_tagged_subtitles=identify_speakers_with_nlp(sub-
  titles)
for subtitle in nlp_tagged_subtitles[:5]:
    print(subtitle)
```

Classifying involves making decisions regarding the currently active speaker, whether it is speaker one or speaker two, mainly when speaker diarization is unavailable. For example, in closed captioning in films, the captions do not indicate the current speaker and only provide text on the screen from whoever is speaking. The process of differentiating between speakers in these instances is not a trivial task and presents considerable challenges.

In some examples, the model processes waves, whether they constitute a pure PCM signal or not, and subsequently generates pairs based on this data. There exists a distinction between the phase of training the base model and its deployment in production. In some examples, during the training phase, the model is structured as a base large language model (LLM), incorporating the vectorization of diverse multidimensional elements of voice along with the pairs generated from the training dataset.

In a real-time application, the model is utilized to generate the construct termed Intuition. An LLM operates by accepting an input, processing it iteratively to produce a partial output, and cycling through this process repeatedly to achieve the final output. Simultaneously, the process includes fine-tuning, which involves modifying the weights of the base model to align it more closely with the preferences of the individual user.

When the model analyzes the user's conversation, it predicts the subsequent interactions (e.g., five future interactions). Upon receiving the user's response, the model performs a computation to reassess the accuracy of its anticipation. It acknowledges any inaccuracies in that particular interaction while recognizing the correctness of subsequent interactions. This process represents a distinctive occurrence in human-AI dialogue, as it involves the model assessing its performance in real time. The model reorders its responses, determining which were effective and which were not. The model then selects the most appropriate response for implementation.

This is important because when a comprehensive context of an extensive conversation is maintained with an LLM, it assigns equal value to all the data. The model cannot prioritize this information effectively. The method of ranking responses during an ongoing conversation is novel.

The concept resembles the process in which humans engage in communication correction. For instance, if an individual tells a joke to another, and the joke fails to amuse, resulting in no laughter, the individual recognizes the joke was not effective. This realization encourages adaptation to similar future situations. This type of feedback is relevant to model training, as it informs models of acceptable outputs. During training, if an output is associated with a value of zero, it indicates to the model that the response is undesirable. Conversely, assigning a value of one confirms the response as appropriate. Associating these computational values with each response educates the model. The pretraining phase defines a zero rating as undesirable, and when a response receives a zero, it reinforces this understanding. The system learns without explicit input from the user, who responds naturally without assigning explicit values to interactions.

An aspect of the operational mechanisms of these systems, particularly in the context of ChatGPT, involves a departure from the conventional model of a singular input producing a singular output. The OpenAI APIs are designed to facilitate multiple outputs, allowing for the generation of numerous variations of a response. In practice, this functionality enables an application developer to receive multiple responses (e.g., four) and subsequently choose which one to display based on judgment. The additional responses are available for review, offering a range of options to the developer beyond the displayed outcome.

There are potentially three alternative responses that were not utilized. The model would evaluate these responses to predict the subsequent progression of a conversation. The analysis would indicate that, in the most recent turn, prompt number two would have been a more suitable choice than response number one. The model's capability for immediate learning is enhanced as it receives information on how to adjust its outputs. This process effectively allows the model to realize that response one was less effective, whereas response two would have achieved a more desirable outcome. Consequently, the model will generate future responses appropriately, informed by this feedback.

One objective is to achieve a more human-like interaction with artificial intelligence that demonstrates an enhanced understanding, thereby reducing the necessity for prompt engineering. One goal is to eliminate the requirement for prompt engineering.

Figure 14:
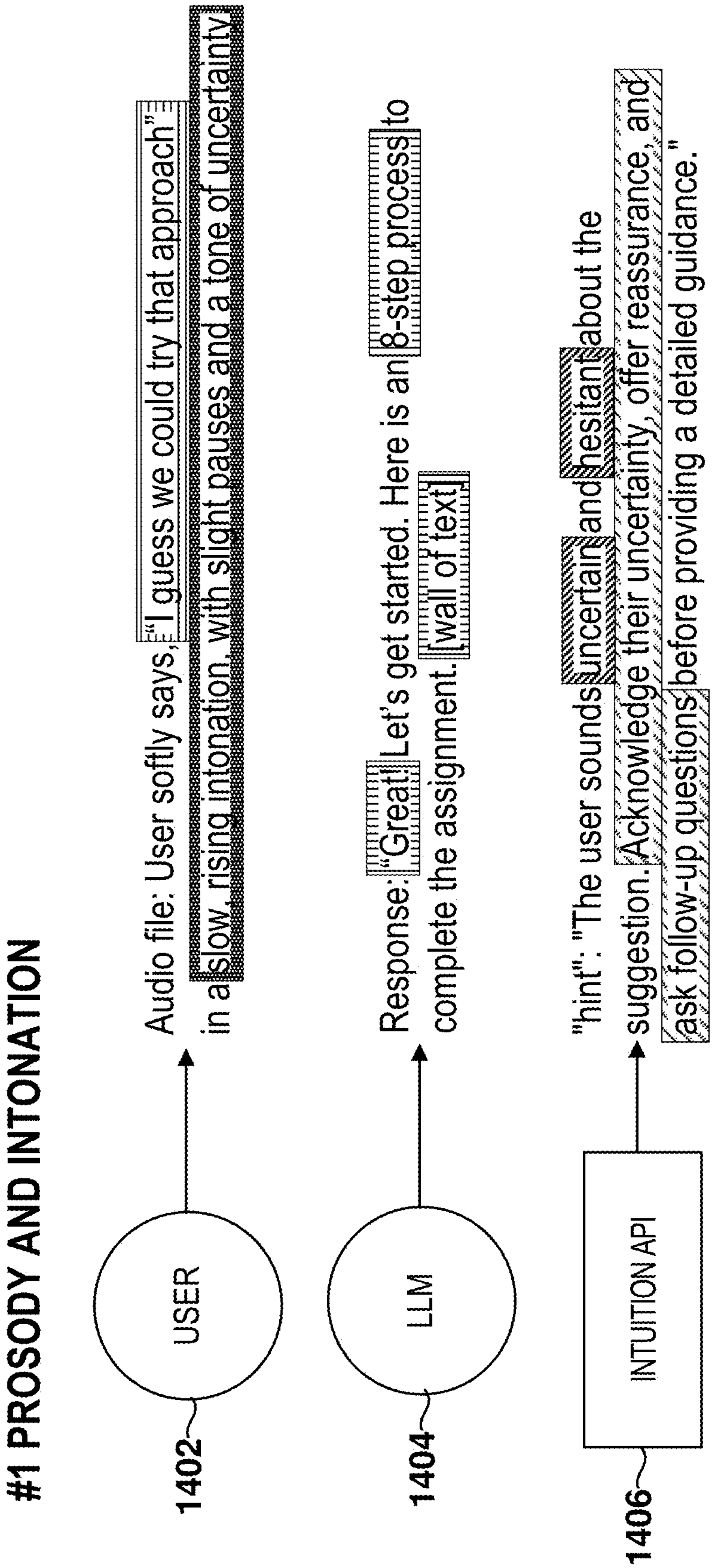
FIG. 14 shows a system for the evaluation of prosody and intonation in user interactions, highlighting the interplay between a user, the LLM 1404, and an Intuition API 1406, according to some examples.

FIG. 14 shows a system for the evaluation of prosody and intonation in user interactions, highlighting the interplay between a user 1402, an LLM 1404, and an Intuition API 1406, according to some examples.

Some of the applications where SMLTalk can help include:

- Education: by embedding learning objectives or referencing academic standards (e.g., Common Core), SMLTalk can deliver specialized tutoring sessions. The Intuition module ensures continuity across multiple days or lessons.
- Customer Service: agents can handle a user's ongoing tickets with full knowledge of prior interactions and wait times. The system's emotional tags help the AI respond empathetically.
- Healthcare: voice-first AI can track patient concerns over time, capturing emotional states ("anxiety," "stress") and referencing prior appointments or instructions.
- Accessibility: users with disabilities can rely on the system's voice-based, time-aware conversation pipeline. The Intuition module fosters more natural, continuous dialogues spanning multiple sessions.

SMLTalk interprets and responds to the nuances of spoken language, particularly focusing on the emotional and tonal aspects conveyed by the user. The user 1402 provides an audio input, e.g., the phrase "I guess we could try that approach," which is characterized by a slow, rising intonation, slight pauses, and a tone of uncertainty.

This input plays a significant role in setting the stage for the subsequent processing by the system, emphasizing the importance of capturing the subtleties in speech that go beyond mere textual content. The LLM 1404 processes the user's input and generates a response.

In this example, the response is, "Great!Let's get started. Here is an 8-step process to complete the assignment." This response, however, does not fully account for the user's tone of uncertainty, indicating a potential gap in the LLM's ability to interpret and react to emotional cues without additional guidance.

The Intuition API 1406 is part of SMLTalk and plays an important role in bridging this gap by providing a "hint" to the LLM 1404. The hint suggests that the user 1402 sounds uncertain and hesitant about the suggestion, advising the LLM 1404 to acknowledge the user's uncertainty, offer reassurance, and ask follow-up questions before providing detailed guidance. The Intuition API 1406 enhances the LLM's response by incorporating an understanding of the user's emotional state, thereby improving the interaction's relevance and empathy.

Figure 15:
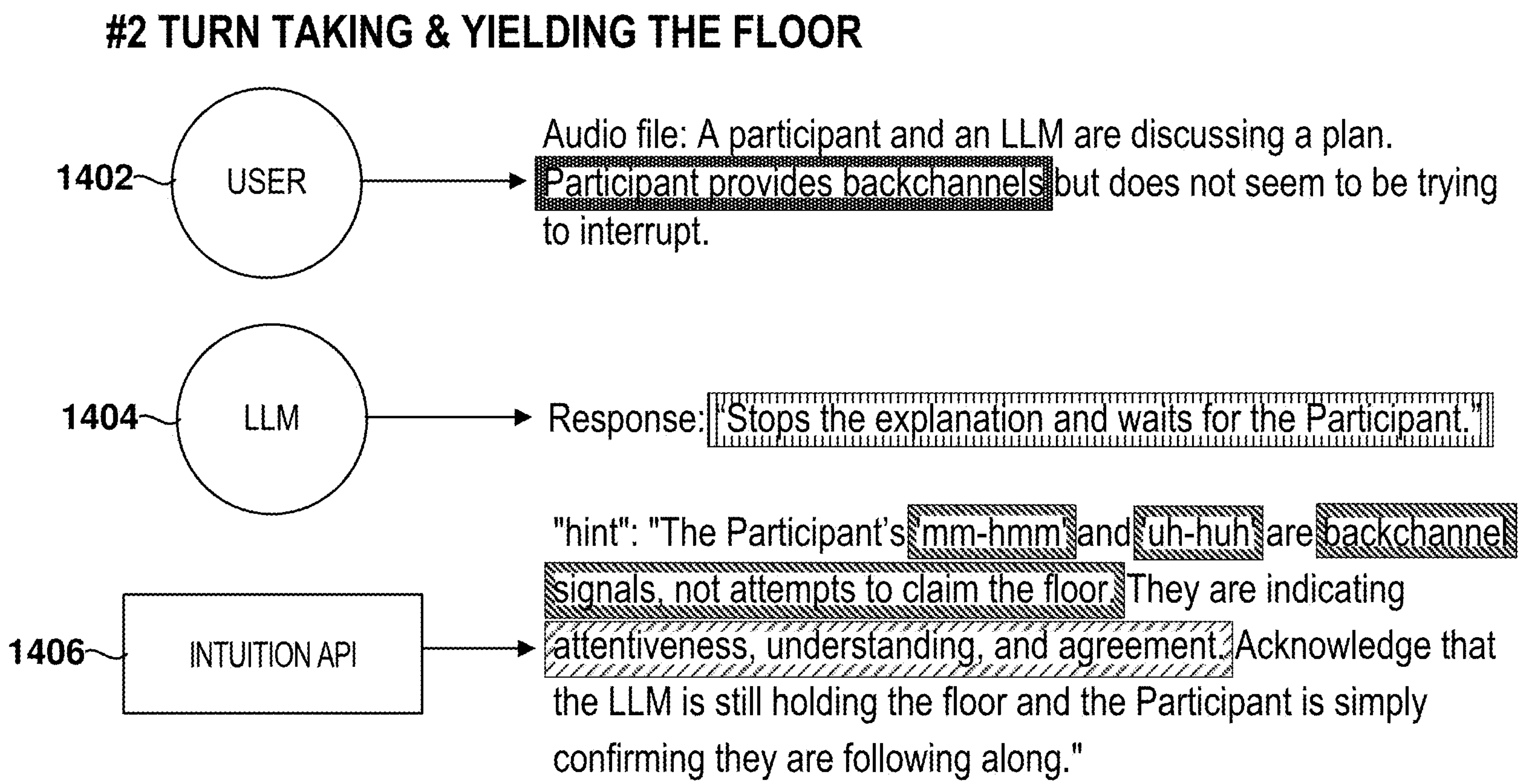
FIG. 15 shows a user interacting with the LLM, facilitated by the Intuition API, according to some examples.

FIG. 15 shows a user 1402 interacting with the LLM 1404, facilitated by the Intuition API 1406, according to some examples. The concept of turn-taking and yielding the floor during a conversation between the user 1402 and the LLM 1404 is illustrated.

The user 1402 is depicted as providing backchannel signals, such as "mm-hmm" and "uh-huh," which are common in conversational dynamics to indicate attentiveness, understanding, and agreement without interrupting the speaker. These signals play an important role in maintaining the flow of conversation, as they allow the speaker to continue without feeling the need to yield the floor prematurely.

The LLM 1404, upon receiving these backchannel signals, interprets them as indications that the user 1402 is engaged and following along rather than attempting to take over the conversation. As a result, the LLM pauses the explanation, waiting for further input from the user 1402, thereby demonstrating an understanding of conversational cues and the importance of turn-taking.

The Intuition API 1406 plays a role in this interaction by providing hints to the LLM 1404. The Intuition API 1406 interprets the user's backchannel signals and informs the LLM 1404 that these signals are not attempts to claim the floor but rather confirmations of understanding.

This process ensures that the LLM 1404 can adjust its response strategy accordingly, maintaining a smooth and coherent dialogue with the user 1402.

Figure 16:
FIG. 16 shows the interaction between a user, the LLM, and the Intuition API, focusing on the use of paralinguistic signals to enhance communication, according to some examples.

FIG. 16 shows the interaction between the user 1402, the LLM 1404, and the Intuition API 1406, focusing on the use of paralinguistic signals to enhance communication, according to some examples.

The user 1402 provides an audio input characterized by a soft, nervous laugh, suggesting a level of uncertainty or hesitation in their statement, e.g., "we could try writing the story that way." The LLM 1404 processes this input and generates a response. However, the response "Excellent!" followed by a lengthy text does not adequately address the user's emotional state, leading to a termination of the chat by the user 1402.

This example highlights a common limitation in traditional LLMs, which often fail to interpret and respond to paralinguistic cues effectively. The Intuition API 1406 is instrumental in bridging this gap by analyzing the user's paralinguistic signals, such as the brief, hesitant laugh, to infer underlying emotions like nervousness or uncertainty. The API generates a hint for the LLM 1404, advising the system to acknowledge the user's discomfort and respond supportively. This involves encouraging the user 1402 to elaborate on their idea or reassuring them that their input is valued, thereby fostering a more empathetic and engaging interaction. The integration of the Intuition API 1406 with the LLM 1404 represents a significant advancement in AI communication, enabling the system to interpret subtle emotional cues and adjust responses accordingly. This approach not only improves the user experience by making interactions more human-like but also enhances the effectiveness of AI systems in various applications where understanding and responding to emotional nuances are of great importance.

Figure 17:
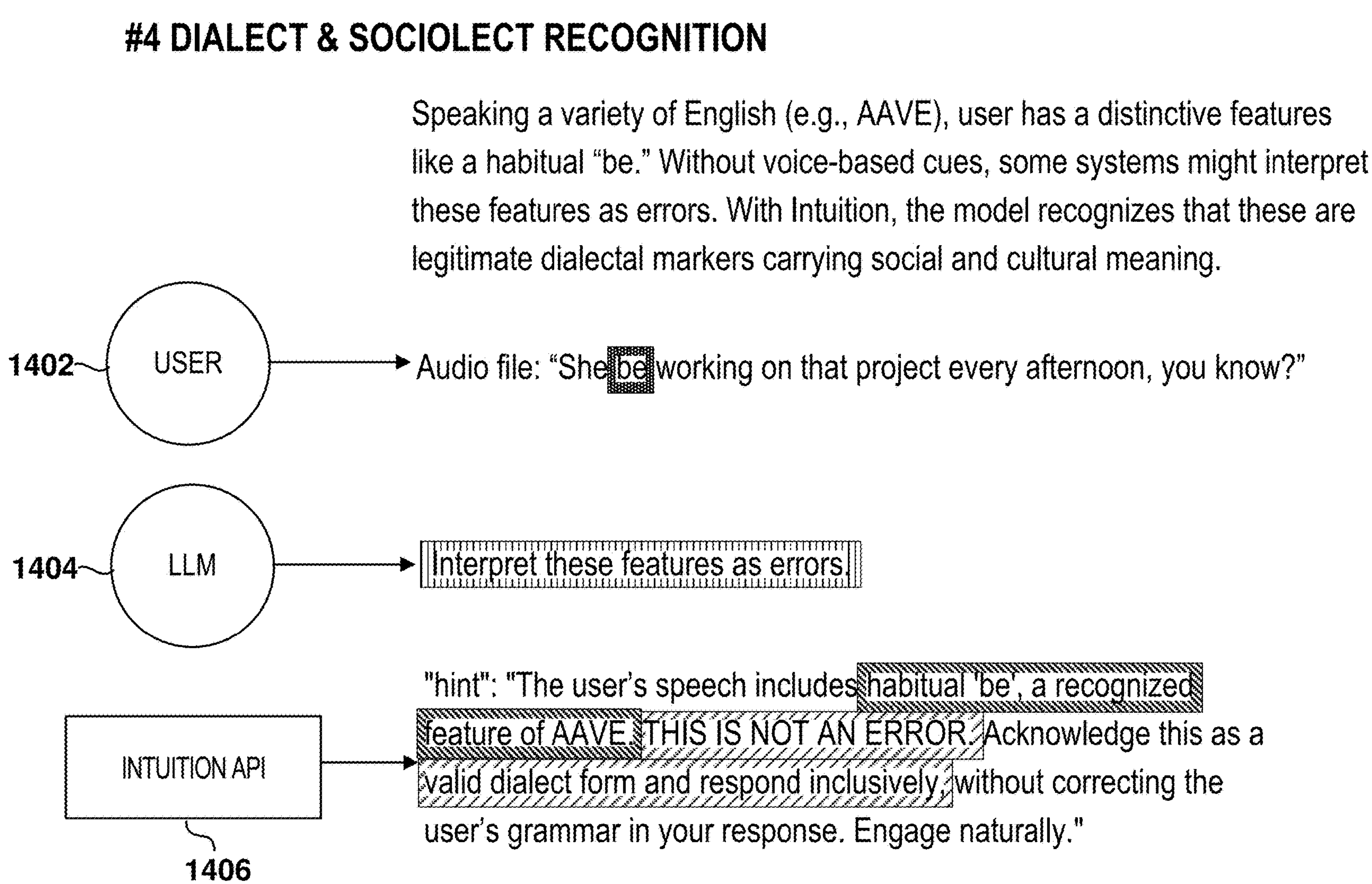
FIG. 17 shows a system for dialect and sociolect recognition, highlighting the interaction between a user, the LLM, and an Intuition API, according to some examples.

FIG. 17 shows a system for dialect and sociolect recognition, highlighting the interaction between a user 1402, the LLM 1404, and an Intuition API 1406, according to some examples.

In this example, the user 1402 provided an audio input that included dialect-specific features, such as the habitual "be" commonly found in African American Vernacular English (AAVE). This input exemplifies how dialectal variations can be misinterpreted by conventional language models. The LLM 1404 processes the user's input and initially interprets these dialectal features as errors.

This misinterpretation is a common issue with traditional language models that lack the capability to recognize and appropriately handle sociolects and dialects, leading to responses that may not be culturally sensitive or accurate.

The Intuition API 1406 plays an important role in addressing this limitation by providing a "hint" to the LLM 1404. The hint informs the LLM that the user's speech includes recognized dialect features, such as the habitual "be" in AAVE, and emphasizes that these are not errors. The Intuition API 1406 guides the LLM 1404 to acknowledge these features as valid dialect forms and to respond inclusively without attempting to correct the user's grammar.

This ensures that the interaction remains natural and respectful of the user's linguistic background. By integrating the Intuition API 1406, the system enhances the large language model's (LLM) ability to engage with users in a manner that respects and understands diverse linguistic expressions. This development is noteworthy as it allows for more accurate and culturally aware interactions, improving the user experience and broadening the applicability of language models across different dialects and sociolects.

Below are additional examples of applications for SML-Talk in different scenarios.

In education, the context is that an App provides AI-driven reading assessments and coaching to help students improve literacy.

Benefit of Intuition: emotional clarity in young readers: children often express frustration or confusion not in clearly stated queries but in tones, hesitations, or complaints. Intuition could detect emotional cues, even sarcasm, from spoken questions like "I love this story" or "This word is too hard" and convert them into actionable prompts with past context for the primary LLM. Instead of just delivering a definition, the system could respond with references to previous conversations and progress.

Personalized Interaction: If a child sounds hesitant, Intuition can help the primary LLM choose a more patient, step-by-step explanation based on past successful interactions confirmed via RL. For example, it might reframe "I don't get this!" into "The student is stuck on the pronunciation of [specific word]. Provide a gentle breakdown."

In work training, the context is that an App helps learners track skills and build their learning profiles.

Benefit of Intuition: career guidance clarification, a user might say, "I feel stuck. I'm good at data analysis but hate coding, where do I go from here?" Intuition understands the user wants guidance on skill paths and potential career tracks. The LLM can respond with curated learning recommendations and career suggestions instead of providing coding progression modules.

Skepticism/Testing the System: a professional might say, "Sure, develop my skills." Intuition senses possible cynicism and confirms it from past conversations. The LLM then responds by transparently showing skill assessment criteria, data-driven recommendations, and personalized learning paths to earn the user's trust.

In healthcare, the context is that a partner submitted a claim for a 60-minute behavioral health tele-session (CPT code 90837) for a student struggling with anxiety.

The payer response (voice recording) is a recorded call or live phone conversation. The Payer Agent says, "We reviewed the claim for service date October 15th. Unfortunately, according to the patient's policy, extended 60-minute behavioral health sessions aren't covered at the full rate without prior authorization. We must decline payment at this time."

Intuition's Interpretation: Intuition listens and detects the payer's mention of a policy limitation and the root cause: missing pre-authorization for extended sessions. The "true meaning" is that the payer denies this claim primarily due to a policy stipulation that requires additional operations or documentation, not because the service is inherently non-reimbursable.

The LLM action is guided by Intuition. First, Intuition signals that the LLM should respond aggressively and strategically. Second, the LLM prepares a rebuttal and triggers a function call to a specialized AppealsPreparation tool. One example method is as follows:

function_call(name="AppealsPreparation", arguments={
"claim_id": "12345",
"appeal_type": "Policy Exception",
"supporting_docs": ["Initial Assessment Note", "Medical Necessity Letter" ],
"payer_policy_reference": "Extended Session Coverage Exception Guidelines"
})

The LLM composes a follow-up response referencing parity laws and policy exceptions, guided by Intuition's RL training, which has learned that emphasizing the patient's educational environment and the necessity for extended sessions can improve outcomes.

The LLM might say (to the payer via a prepared letter, portal message, call, or fax): "We understand the initial denial. However, this service was provided in an educational setting where the patient required extended therapeutic support due to documented anxiety impacting academic participation. According to your policy's section on extended therapy (Ref. #45.6), we can provide medical necessity documentation. We respectfully request a reconsideration and will submit the pre-authorization retrospectively under your extended coverage exception policy."

The result is that Intuition's aggressive approach leads to an immediate appeal submission with detailed, policy-referenced supporting documents. The RL model has learned from previous successes that citing specific policy segments and providing thorough clinical justification increases the likelihood of overturning the denial.

In a second scenario, a payer requests additional information. The context is that a Partner submitted a claim for a 30-minute behavioral telehealth check-in (CPT code 90832) for a student experiencing mild stress. The claim is pending.

Payer Response (Voice): Payer Agent: "We need the student's progress notes and a brief treatment plan summary to ensure medical necessity. Without these additional documents, we can't process this claim."

Intuition's Interpretation: Intuition understands the payer isn't declining the claim but requesting more documentation. The "true meaning" is that the payer wants validation of medical necessity through standard clinical documentation.

LLM Action Guided by Intuition:

1. Audio-Derived Documentation Drafting: Intuition has access to the session's audio recording. It uses its language understanding capabilities and training on millions of voice hours to automatically generate a draft set of progress notes and a concise treatment plan summary (no clinician data entry is required initially). The method is a function call:

function_call
(name="GenerateProgressNotesFromAudio", arguments={
"patient_id": "A1234",
"session_audio": "session_A1234_2024-10-15_audiofile.mp3"
})

After receiving the draft from the function, Intuition integrates the generated notes into a secure interface visible to the clinician.

The clinician sees a drafted note like: "The student presented with mild somatic complaints (stomach aches) linked to anxiety about academic performance and social interactions. During the 30-minute session, we discussed simple coping strategies and provided reassurance, which the student reported helped reduce immediate stress. The care plan includes scheduling a follow-up check-in and considering a brief intervention focused on anxiety-reduction techniques."

Draft Treatment Plan Summary: "Short-term intervention to manage mild anxiety symptoms in educational settings. Sessions focus on identifying triggers, teaching coping strategies, and reinforcing self-confidence. Follow-up recommended to track progress."

The clinician only needs to click "Accept" to confirm these notes. If needed, the clinician can make minor edits before accepting. This reduces administrative burden and ensures rapid turnaround.

Once the clinician accepts, the LLM triggers another function call to finalize the submission:

function_call(name="SubmitSupportingDocuments",
arguments={
"claim_id": "67890",
"documents": ["ProgressNote_Oct15.pdf", "TreatmentPlan_Summary.txt" ]
})

The LLM then sends a confirmation message, call, and fax when appropriate to the payer:

"Dear [Payer], we have attached the requested progress notes and treatment summary. These confirm the medical necessity for the reported session. We look forward to prompt claim resolution."

The result is that the required documentation is prepared automatically from session audio, drastically reducing administrative overhead for the clinician. By enabling a simple "Accept" action, Intuition streamlines the entire process, ensuring that the payer receives complete, accurate information promptly. Additionally, clinicians do not need specialized training to prepare post-session notes.

This accelerated compliance approach, guided by RL-informed strategies, shortens payment cycles and increases overall reimbursement efficiency.

In a classroom communication platform, the context is that an App connects teachers, parents, and students, often with short messages and updates.

The benefit of Intuition: Intent Refinement for Confusing Voice Notes: When a parent sends a voice message that's half venting and half requesting a meeting, Intuition can parse these emotional overtones and clarify: "Parent is concerned about bullying and wants to schedule a meeting." The knowledge LLM could then respond with actionable next actions.

Cultural and Emotional Sensitivity: Teachers dealing with diverse communities may leave voice memos with subtle concerns. Intuition can highlight important emotional cues (e.g., worry about a student's performance) so the system can suggest a supportive next action more empathically.

In integrated curriculum management, the context is that an App helps teachers integrate curriculum, assessments, and communication.

The benefit of Intuition: complex, multi-part queries: a teacher's voice command might say, "I'm feeling a bit overwhelmed with the pacing guide; maybe we need to slow down Unit 3 and add a quiz before the final?" Intuition can clarify this into a structured request for curriculum adjustments.

Disambiguating support queries: teachers asking vaguely for "help" might be frustrated by technology or unclear about features. Intuition detects frustration and guides the knowledge LLM to produce descriptive instructions or step-by-step help.

In learning tools and flashcards, the context is that an App provides practice exercises, flashcards, and study games.

Benefit of Intuition: Understanding Learner's Struggle Areas: When a student says aloud, "I keep mixing up these terms. I know what photosynthesis is, but I can't remember the inputs," Intuition refines this into a request for more targeted practice or a different explanatory angle. The primary LLM can then suggest mnemonic devices or a simpler explanation.

Adaptive Challenge Levels: A student might say, "Yeah, I'm so thrilled to study the periodic table again." Intuition translates this as reluctance and lack of motivation. The LLM responds with a more gamified approach, perhaps suggesting memory tricks or interactive quizzes to rekindle engagement.

In engaging leveled content, the context is that an App curates news and nonfiction content at various reading levels.

Benefit of Intuition: Tailoring Reading Material Based on Student Emotion or Difficulty: A student's voice request might sound bored, frustrated, or intrigued. Intuition can detect: "Student is feeling unchallenged by current article level." The primary LLM can then adjust the reading level or suggest more engaging topics.

Teacher Customization: A teacher sighs, "These reading levels are all over the place. I don't know where to start." Intuition interprets anxiety and prompts the LLM to give supportive, personalized recommendations on how to group students by reading level or use differentiation tools more effectively.

In expert-led courses, the context is that an App offers courses taught by prominent experts in various creative and professional fields.

The benefit of Intuition: star-struck enthusiasm: a learner gushes, "Oh my gosh, I love Natalie Portman's acting. I want to learn how she prepares for roles!" Intuition hears excitement and hero worship. The LLM can then highlight relevant lessons, offer behind-the-scenes insights, and suggest related courses to fuel that passion.

Subtle Doubt/Need for Practicality: Another user quietly wonders, "This is cool, but . . . ?" Intuition notes a desire for practical application. The LLM provides concrete tips, exercises, or case studies that bridge theory and practice.

In connecting students/grads with employers, the context is that an App helps new graduates find jobs and internships.

Benefit of Intuition: Refining Employer Searches: A student might say, "I really want to help people, but I hate the cubicle life." Intuition turns that into a search criterion, perhaps highlighting community-based internships or field roles.

Addressing Application Anxiety: If a user sounds nervous about interviews but does not explicitly express the concern, Intuition ascertains the tone and signals the LLM to provide practice questions, confidence-building tips, or recommended resources.

One reason for generating code is the potential usage of this code within another API, e.g., to generate form letters, dispatch letters, and initiate system responses. The code can instruct not only the language learning model but also other systems on methods of responding. This resembles the automatic coordination of a sequence of actions.

For instance, in a scenario for working on a spreadsheet, Visual Basic code can be inserted within a Language Model response. Subsequently, when an application such as Excel processes it, the application executes a function. The action involves providing executable code. This approach employs semantics to facilitate the creation of automated processes. For example, it is feasible to initiate a referral to another physician or conduct an investigation into a claim. Such processes can be initiated through a semantic understanding of the request. The system comprehends that when a user expresses frustration, the likely underlying issue may be, for instance, a denied claim, and it can guide the resolution of that claim accordingly.

Figure 18:
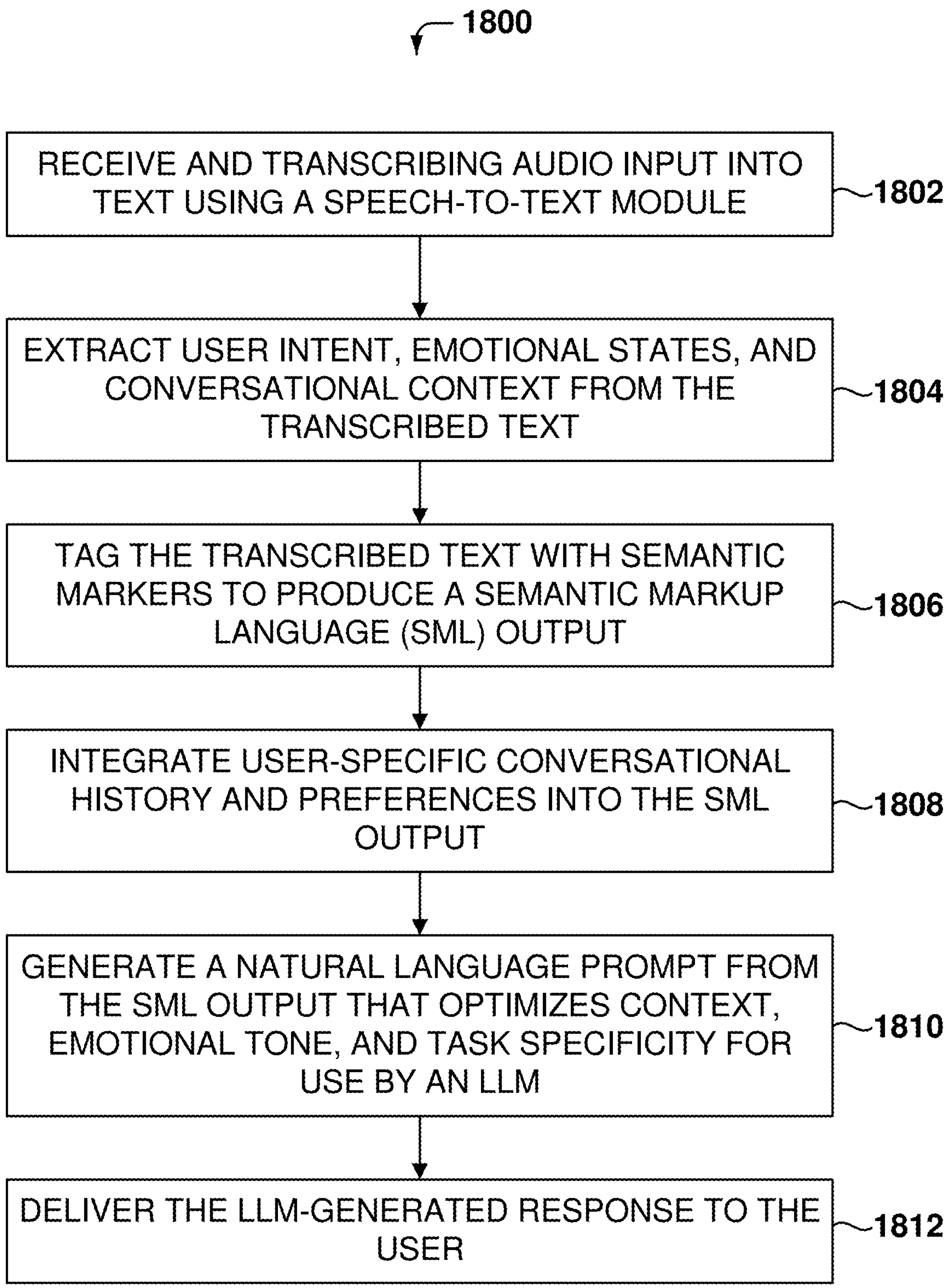
FIG. 18 is a flowchart of a method for determining the semantic meaning of conversations to enhance chatbot interactions, according to some examples.

FIG. 18 is a flowchart of a method 1800 for determining the semantic meaning of conversations to enhance chatbot interactions, according to some examples. While the various operations in this flowchart are presented and described sequentially, one of ordinary skill will appreciate that some or all of the operations may be executed in a different order, be combined or omitted, or be executed in parallel.

Operation 1802 is for receiving and transcribing audio input into text using a speech-to-text module. This operation involves capturing spoken language and converting the language into a textual format, which serves as the foundation for further processing. The speech-to-text module is responsible for accurately transcribing the audio input, ensuring that the nuances of spoken language are preserved in the text.

From operation 1802, the method flows to operation 1804, where the transcribed text is analyzed to extract user intent, emotional states, and conversational context. This operation involves parsing the text to identify the underlying purpose of the user's communication, as well as any emotional cues that may be present. The extraction process utilizes natural language processing techniques to discern the user's intent and emotional state, providing a deeper understanding of the conversation.

Following operation 1804, the method proceeds to operation 1806, where the transcribed text is tagged with semantic markers to produce a Semantic Markup Language (SML) output. This operation involves annotating the text with tags that represent various semantic elements, such as emotional tone, intent, and contextual references. The SML output serves as a structured representation of the conversation, enabling more precise interpretation and response generation.

From operation 1806, the method advances to operation 1808, which involves integrating user-specific conversational history and preferences into the SML output. This operation ensures that the generated SML output is tailored to the individual user's past interactions and preferences, enhancing the personalization of the response. The integration process involves accessing stored user data and incorporating relevant historical context into the SML output.

At operation 1810, the method generates a natural language prompt from the SML output that optimizes context, emotional tone, and task specificity for use by an LLM 1404. This operation involves transforming the structured SML output into a coherent prompt that can be processed by the LLM 1404. The prompt is designed to encapsulate the user's intent, emotional state, and contextual information, ensuring that the LLM 1404 can generate a response that is both relevant and contextually appropriate.

From operation 1810, the method proceeds to operation 1812, where the LLM-generated response is delivered to the user. This operation involves presenting the response generated by the LLM to the user and completing the interaction cycle. The delivery process may involve converting the response back into audio format for voice-based interactions or presenting the response as text, depending on the user's preferences and the nature of the interaction.

Example 1. A computer-implemented method for preparing timestamped one-to-one conversational data for training a companion model in an AI system, the method comprising: collecting one-to-one conversation logs, each log including textual utterances produced by two participants; extracting a timestamp for each utterance, the timestamp corresponding to the date and time at which the utterance was produced; annotating each utterance with one or more metadata labels, the metadata labels including at least speaker identity, emotional state, or user intent; linking each utterance with a preceding or subsequent utterance based on chronological order, thereby forming a turn-based conversation structure; and storing the annotated conversation logs in a structured data format such that a companion model can use the annotated logs to learn time-aware, multi-turn conversational behavior.

Example 2. The method of claim 1, wherein emotional state labels are derived through a combination of automated sentiment analysis and manual validation by human annotators.

Example 3. The method of any one or more of Examples 1-2, further comprising: anonymizing any user-identifying information within the conversation logs to preserve privacy compliance.

Example 4. The method of any one or more of Examples 1-3, wherein the structured data format is selected from the group consisting of JSON, XML, or a relational database schema, the format including fields for timestamps, speaker IDs, and annotation tags.

Example 5. The method of any one or more of Examples 1-4, further comprising: splitting the annotated conversation logs into training, validation, and testing subsets, wherein at least one subset includes conversations from multiple domains to ensure diverse coverage for training a companion model.

Example 6. The method of any one or more of Examples 1-5, further comprising: calculating an elapsed time interval between consecutive utterances in the conversation to capture the waiting periods or response delays.

Example 7. The method of any one or more of Examples 1-6, wherein speaker identity includes at least one user ID and one agent ID, each associated with a distinct participant in the one-to-one conversation.

Example 8. The method of any one or more of Examples 1-7, wherein user intent labels include a request for information, an emotional support request, or a domain-specific action request (e.g., factoring an equation).

Example 9. The method of any one or more of Examples 1-8, further comprising: version controlling the annotation process by generating incremental dataset releases to track improvements in labeling accuracy.

Example 10. The method of any one or more of Examples 1-9, wherein the turn-based conversation structure is used to train a smaller companion model configured to provide contextual or semantic overlays for a primary language model in real-time AI dialogues.

Example 11. A system for generating a timestamped, one-to-one conversational dataset suitable for training a companion model in an AI system, the system comprising: a data ingestion module configured to retrieve conversation logs from one or more sources; a timestamp extraction module configured to associate each utterance with a precise date-time value; an annotation engine configured to apply emotional state labels, intent labels, and speaker IDs to each utterance; a turn-linking engine that sequences utterances chronologically, forming a multi-turn conversation structure; and a storage component that organizes the resulting annotated logs into a dataset usable for training a companion model to perform multi-turn reasoning and time-aware conversational tasks.

Example 12. The system of Example 11, wherein the annotation engine includes a human-in-the-loop interface allowing human reviewers to correct or override automated labels.

Example 13. The system of any one or more of Examples 11-12, further comprising: an export module that provides the annotated dataset in a standardized data format, including but not limited to JSON or XML, for ingestion into downstream machine learning frameworks.

Example 14. A method of using the annotated dataset produced by the system of claim 11 for training a smaller companion model, comprising: loading the timestamped, turn-linked conversation data into a training pipeline; parsing each utterance's metadata, including emotional and intent labels, as additional input signals for the companion model; optimizing the companion model's parameters to learn patterns of user frustration, confusion, or extended time gaps; and deploying the trained companion model to supply semantic or time-aware guidance to a primary language model during live user interactions.

Example 15. A computer-implemented method for incorporating timestamps and temporal reasoning into a conversational AI pipeline, the method comprising: capturing a timestamp for each user utterance in a conversation, the timestamp indicating the real-world date and time of the utterance; normalizing each timestamp into one or more time-based features, including a duration since a previous utterance or a time-of-day category; storing the time-based features in a memory pipeline along with corresponding textual content of each utterance; parsing user utterances for temporal expressions (e.g., "yesterday," "two hours ago") and mapping them to the normalized timestamps; and applying temporal reasoning logic to generate an updated conversation context that references or prioritizes certain utterances based on their timestamps and durations.

Example 16. The method of Example 15, further comprising: identifying gaps longer than a threshold (e.g., one hour) between consecutive utterances and tagging the conversation to indicate a potential session boundary or inactivity period.

Example 17. The method of any one or more of Examples 15-16, wherein temporal expressions in the user's utterances are translated into absolute or relative times based on the current conversation timestamp.

Example 18. The method of any one or more of Examples 15-17, further comprising: adjusting the AI's response generation when the normalized features indicate the user has returned after a prolonged absence.

Example 19. The method of any one or more of Examples 15-18, wherein the method includes forward-looking timestamps for scheduled events, enabling reminders or escalations at designated future times.

Example 20. The method of any one or more of Examples 15-19, wherein the conversation context includes an urgency flag if the elapsed time between user requests exceeds a specified threshold.

Example 21. The method of any one or more of Examples 15-20, wherein the system derives user impatience or frustration levels from short intervals between consecutive utterances.

Example 22. The method of any one or more of Examples 15-21, wherein the conversation context is shared with a smaller companion model configured to interpret timestamps and produce semantic overlay data for a primary language model.

Example 23. A system for enabling timestamp-based and time-aware conversational AI, comprising: a timestamp capture module configured to associate each utterance with an absolute or relative time value; a normalization module configured to compute durations between utterances, daily or weekly intervals, and session boundaries; a temporal parser configured to detect user references to past or future times and align them with stored timestamps; and a memory pipeline that retains the processed conversation data for multi-turn continuity, wherein the system applies time-based logic to refine context retrieval.

Example 24. The system of Example 23, wherein the temporal parser uses a rule-based or ML-based approach to convert informal references (e.g., "last weekend") into a structured time value.

Example 25. A method of using the system of Example 24 to enhance multi-session continuity, comprising: detecting a user's return after a predefined period of inactivity; retrieving from the memory pipeline prior utterances associated with timestamps falling within a specified historical window; generating a context summary that highlights time-sensitive or overdue items; and presenting the summary to either the user or a companion model for subsequent dialogue.

Example 26. The method of Example 25, wherein the context summary includes an elapsed time indicator for each item and any relevant urgent tags.

Example 27. The system of any one or more of Examples 25-26, wherein the normalization module also encodes time-of-day (morning, afternoon, evening) to model user behavior patterns over daily cycles.

Example 28. The system of any one or more of Examples 25-27, wherein the memory pipeline maintains versioned records of conversation turns, each annotated with timestamp and time-based features, to allow backward or forward reference across multiple days or sessions.

Example 29. A computer-implemented system for generating context-informed responses in a conversational AI environment, comprising: a primary large language model (LLM) configured to generate responses to user inputs; a companion model, trained on timestamped conversational data, configured to receive a user's new utterance and retrieve relevant multi-turn context, including time intervals and emotional states; and produce a structured overlay or instruction set reflecting user frustration, confusion, or specific task focus; an integration module configured to merge the user's new utterance with the overlay from the companion model into a combined prompt for the LLM; and a response delivery component configured to present the LLM's generated response to the user, wherein the companion model's overlay enhances the LLM's response by incorporating time-aware, emotional, and task-specific context.

Example 30. The system of Example 29, wherein the companion model detects the user's emotional state based on features derived from conversation transcripts, including repeated requests or long wait times.

Example 31. The system of any one or more of Examples 29-30, wherein the timestamped conversational data includes exact or relative time indicators for each user utterance, allowing the companion model to track elapsed time between turns.

Example 32. The system of any one or more of Examples 29-31, wherein the companion model generates a summary of the conversation's key points, tasks, or unresolved questions as part of the overlay.

Example 33. The system of any one or more of Examples 29-32, further comprising: a memory pipeline that stores the user's conversation history in a structured format, enabling the companion model to retrieve relevant prior context.

Example 34. The system of any one or more of Examples 29-33, wherein the overlay is embedded into the LLM's prompt as a specialized markup or JSON structure.

Example 35. The system of any one or more of Examples 29-34, wherein the companion model is an RNN- or Transformer-based network trained primarily on labeled one-to-one dialogues with emotive and timestamp annotations.

Example 36. The system of any one or more of Examples 29-35, wherein the companion model's output includes confidence scores or urgency flags to guide the primary LLM in escalating or simplifying responses.

Example 37. A computer-implemented method for using a companion model to guide a primary language model in generating responses, the method comprising: receiving a new user utterance; retrieving conversation context, including timestamps, emotional states, or domain-specific tags from a memory pipeline; processing the conversation context in the companion model to generate a structured overlay summarizing user intent, frustration level, or time-sensitive aspects; combining the user utterance with the structured overlay into a composite prompt; and providing the composite prompt to the primary language model, which generates a context-rich response to be returned to the user.

Example 38. The method of Example 37, wherein the structured overlay is dynamically updated each time the user's emotional state changes or a new time reference is detected.

Example 39. The method of any one or more of Examples 37-38, further comprising: training the companion model on a dataset of one-to-one conversations annotated with emotional and temporal labels, allowing it to infer user frustration or urgency more accurately.

Example 40. The method of any one or more of Examples 37-39, wherein the companion model calculates the time elapsed since the user's last turn and includes it in the overlay to signal the primary language model about potential user impatience.

Example 41. A conversational AI system comprising: a module integrated with a timestamp normalization component configured to track conversation intervals and session boundaries; a feedback loop wherein the user's subsequent interactions further refine the companion model's ability to detect emotional or time-based cues; a deployment environment in which the companion model and primary LLM run either on the same server or as separate services exchanging prompts via an API.

Example 42. The system of Example 41, wherein domain-specific plugins (e.g., for mathematics, healthcare, or e-commerce) interface with the companion model to produce domain-targeted overlays or instructions.

Example 43. The system of any one or more of Examples 41-42, wherein the companion model is configured to escalate system responses if a user's wait time or repeated requests exceed a specified threshold.

Figure 19:
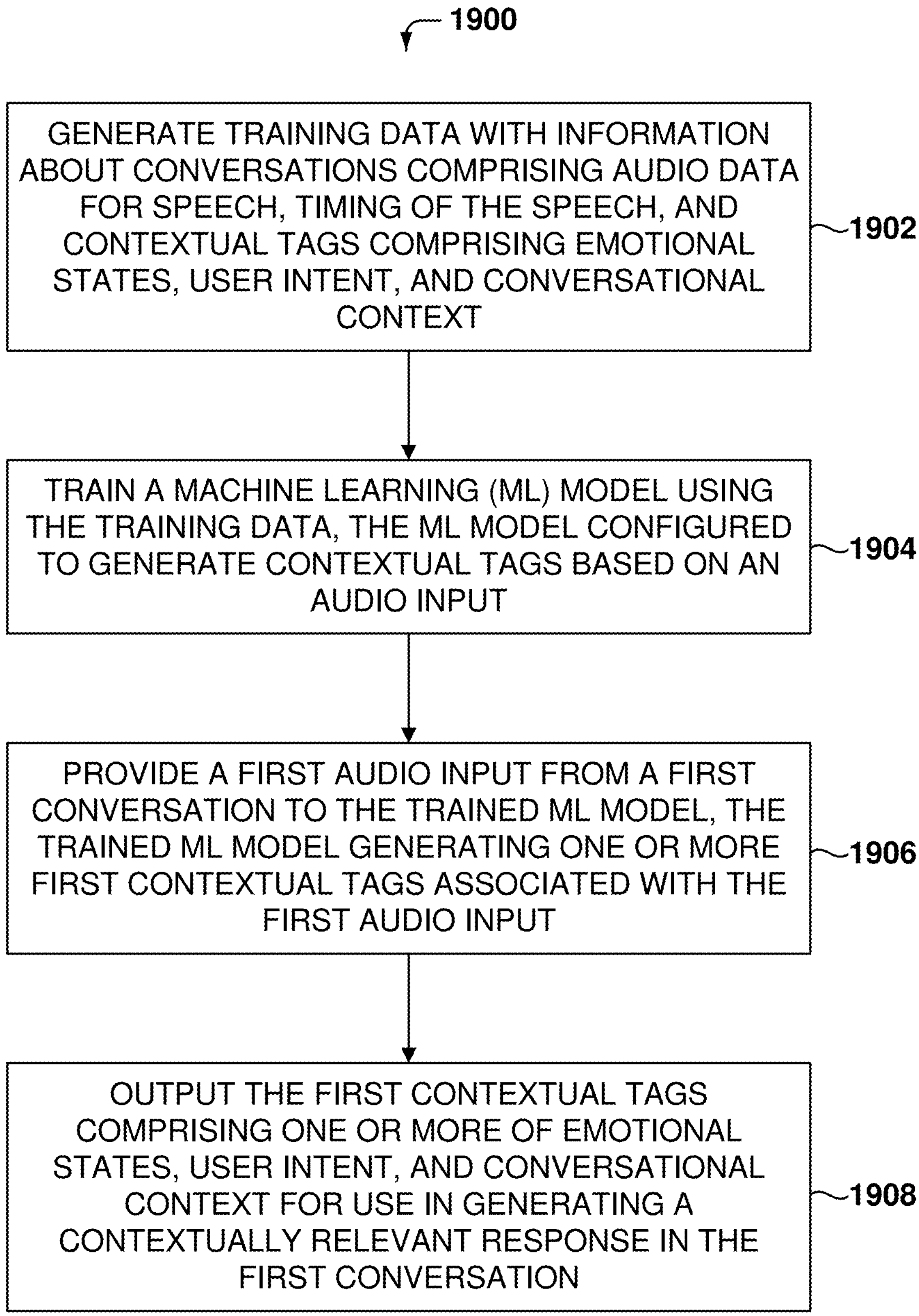
FIG. 19 is a flowchart of a method for generating contextual tags for conversations to enhance chatbot interactions, according to some examples.

FIG. 19 is a flowchart of a method 1900 for generating contextual tags for conversations to enhance chatbot interactions, according to some examples. While the various operations in this flowchart are presented and described sequentially, one of ordinary skill will appreciate that some or all of the operations may be executed in a different order, be combined or omitted, or be executed in parallel.

At operation 1902, training data is generated with information about conversations comprising audio data for speech, timing of the speech, and contextual tags comprising emotional states, user intent, and conversational context.

From operation 1902, the method 1900 flows to operation 1904, where the ML model is trained using the generated training data. The ML model is configured to generate contextual tags based on an audio input. In some examples, the training process involves fine-tuning the model with annotated datasets that include emotional states, user intent, and conversational context. The training may also incorporate techniques such as reinforcement learning from human feedback (RLHF) to improve the model's ability to adapt to diverse conversational scenarios. The ML model is designed to process audio inputs and output contextual tags that capture the nuances of the conversation.

From operation 1904, the method 1900 proceeds to operation 1906, where a first audio input from a first conversation is provided to the trained ML model. The ML model processes the audio input and generates one or more first contextual tags associated with the input. In some examples, the audio input is preprocessed to remove noise and enhance clarity before being fed into the ML model. The generated contextual tags may include indicators of the speaker's emotional state, such as frustration or enthusiasm, as well as the intent behind the utterance, such as a request for information or a need for clarification. The contextual tags may also capture the conversational context, such as references to prior turns in the dialogue.

From operation 1906, the method 1900 advances to operation 1908, where the first contextual tags are output. These tags comprise one or more of emotional states, user intent, and conversational context. The output is used to generate a contextually relevant response in the first conversation. In some examples, the contextual tags are integrated into a prompt for a large language model (LLM), which uses the tags to generate a response that aligns with the user's emotional state and intent. The response may also incorporate task-specific details or references to prior conversational elements, ensuring continuity and relevance.

Example 1. A computer-implemented method comprising: generating training data with information about conversations comprising audio data for speech, timing of the speech, and contextual tags comprising emotional states, user intent, and conversational context; training a machine learning (ML) model using the training data, the ML model configured to generate contextual tags based on an audio input; providing a first audio input from a first conversation to the trained ML model, the trained ML model generating one or more first contextual tags associated with the first audio input; and outputting the first contextual tags comprising one or more of emotional states, user intent, and conversational context for use in generating a contextually relevant response in the first conversation.

Example 2. The method of Example 1, further comprising: generating a prompt based on text of the first conversation and the first contextual tags; and providing the prompt as input to a large language model (LLM) that generates a response to the first audio input.

Example 3. The method of any one or more of Examples 1-2, wherein the prompt includes information about formality, tone, and vocabulary of the first conversation based on user preferences and conversational context.

Example 4. The method of any one or more of Examples 1-3, wherein the contextual tags further comprise tone, intonation, pacing, and pauses to identify user emotional states and conversational urgency.

Example 5. The method of any one or more of Examples 1-4, wherein the contextual tags further comprise focal enhancers to emphasize critical concepts, affective markers to capture emotional states, deictic references to anchor prior conversational elements, task-oriented markup to define user requests, and cognitive demand indicators to specify a level of explanation or detail required.

Example 6. The method of any one or more of Examples 1-5, wherein generating the training data further comprises: processing the audio data of the conversations to extract speech features, the speech features comprising intonation, pauses, pitch, and the timing of the speech.

Example 7. The method of any one or more of Examples 1-6, further comprising: generating a memory pipeline to store a history of the first conversation comprising prior contextual tags of the first conversation to maintain continuity across multiple interactions in the first conversation.

Example 8. The method of any one or more of Examples 1-7, further comprising: diarizing the audio data to separate individual speakers and assigning timestamps to utterances of each speaker.

Example 9. The method of any one or more of Examples 1-8, further comprising: integrating multimodal sentiment analysis by combining audio features with text-based sentiment analysis to enhance an accuracy of the contextual tags.

Example 10. The method of any one or more of Examples 1-9, wherein the ML model is configured to detect and respond to paralinguistic signals, comprising hesitations, nervous laughter, or changes in speech rhythm, wherein the ML model is configured to generate task-specific contextual tags comprising one or more of user requests for clarification, emotional support, or domain-specific assistance.

Example 11. A system comprising: a memory comprising instructions; and one or more computer processors, the instructions, when executed by the one or more computer processors, causing the system to perform operations comprising: generating training data with information about conversations comprising audio data for speech, timing of the speech, and contextual tags comprising emotional states, user intent, and conversational context; training a machine learning (ML) model using the training data, the ML model configured to generate contextual tags based on an audio input; providing a first audio input from a first conversation to the trained ML model, the trained ML model generating one or more first contextual tags associated with the first audio input; and outputting the first contextual tags comprising one or more of emotional states, user intent, and conversational context for use in generating a contextually relevant response in the first conversation.

Example 12. The system of Example 11, wherein the instructions further cause the one or more computer processors to perform operations comprising: generating a prompt based on text of the first conversation and the first contextual tags; and providing the prompt as input to a large language model (LLM) that generates a response to the first audio input.

Example 13. The system of any one or more of Examples 11-12, wherein the prompt includes information about formality, tone, and vocabulary of the first conversation based on user preferences and conversational context.

Example 14. The system of any one or more of Examples 11-13, wherein the contextual tags further comprise tone, intonation, pacing, and pauses to identify user emotional states and conversational urgency.

Example 15. The system of any one or more of Examples 11-14, wherein the contextual tags further comprise focal enhancers to emphasize critical concepts, affective markers to capture emotional states, deictic references to anchor prior conversational elements, task-oriented markup to define user requests, and cognitive demand indicators to specify a level of explanation or detail required.

Example 16. A non-transitory machine-readable storage medium including instructions that, when executed by a machine, cause the machine to perform operations comprising: generating training data with information about conversations comprising audio data for speech, timing of the speech, and contextual tags comprising emotional states, user intent, and conversational context; training a machine learning (ML) model using the training data, the ML model configured to generate contextual tags based on an audio input; providing a first audio input from a first conversation to the trained ML model, the trained ML model generating one or more first contextual tags associated with the first audio input; and outputting the first contextual tags comprising one or more of emotional states, user intent, and conversational context for use in generating a contextually relevant response in the first conversation.

Example 17. The non-transitory machine-readable storage medium of Example 16, wherein the machine further performs operations comprising: generating a prompt based on text of the first conversation and the first contextual tags; and providing the prompt as input to a large language model (LLM) that generates a response to the first audio input.

Example 18. The non-transitory machine-readable storage medium of any one or more of Examples 16-17, wherein the prompt includes information about formality, tone, and vocabulary of the first conversation based on user preferences and conversational context.

Example 19. The non-transitory machine-readable storage medium of any one or more of Examples 16-18, wherein the contextual tags further comprise tone, intonation, pacing, and pauses to identify user emotional states and conversational urgency.

Example 20. The non-transitory machine-readable storage medium of any one or more of Examples 16-19, wherein the contextual tags further comprise focal enhancers to emphasize critical concepts, affective markers to capture emotional states, deictic references to anchor prior conversational elements, task-oriented markup to define user requests, and cognitive demand indicators to specify a level of explanation or detail required.

Figure 20:
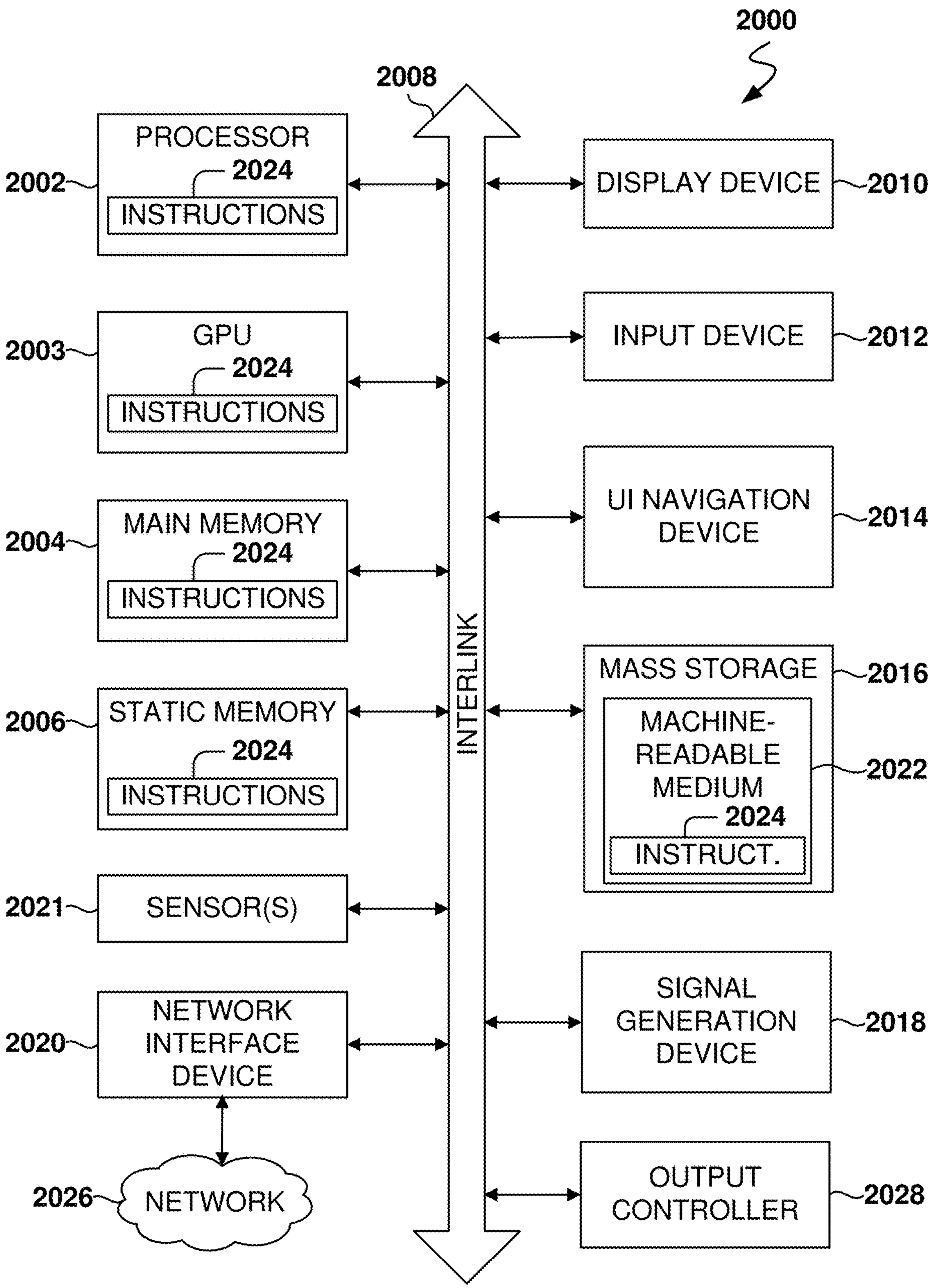
FIG. 20 is a block diagram illustrating an example of a machine upon by which one or more process examples described herein may be implemented or controlled.

FIG. 20 is a block diagram illustrating an example of a machine 2000 upon or by which one or more process examples described herein may be implemented or controlled. In alternative examples, the machine 2000 may operate as a standalone device or be connected (e.g., networked) to other machines. In a networked deployment, the machine 2000 may operate in the capacity of a server machine, a client machine, or both in server-client network environments. In an example, the machine 2000 may act as a peer machine in a peer-to-peer (P2P) (or other distributed) network environment. Further, while only a single machine 2000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 2000 (e.g., computer system) may include a hardware processor 2002 (e.g., a central processing unit (CPU), a hardware processor core, or any combination thereof), a graphics processing unit (GPU 2003), a main memory 2004, and a static memory 2006, some or all of which may communicate with each other via an interlink 2008 (e.g., bus). The machine 2000 may further include a display device 2010, an alphanumeric input device 2012 (e.g., a keyboard), and a user interface (UI) navigation device 2014 (e.g., a mouse). In an example, the display device 2010, alphanumeric input device 2012, and UI navigation device 2014 may be a touch screen display. The machine 2000 may additionally include a mass storage device 2016 (e.g., drive unit), a signal generation device 2018 (e.g., a speaker), a network interface device 2020, and one or more sensors 2021, such as a Global Positioning System (GPS) sensor, compass, accelerometer, or another sensor. The machine 2000 may include an output controller 2028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 2002 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 2002 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio- Frequency Integrated Circuit (RFIC), a Neuromorphic Processor, a Quantum Processor, or any combination thereof.

The processor 2002 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 2002 may be emulated in software, running on a physical processor, as a virtual processor or virtual circuit. The virtual processor may behave like an independent processor but is implemented in software rather than hardware.

The mass storage device 2016 may include a machine-readable medium 2022 on which one or more sets of data structures or instructions 2024 (e.g., software) embodying or utilized by any of the techniques or functions described herein. The instructions 2024 may also reside, completely or at least partially, within the main memory 2004, within the static memory 2006, within the hardware processor 2002, or the GPU 2003 during execution thereof by the machine 2000. For example, one or any combination of the hardware processor 2002, the GPU 2003, the main memory 2004, the static memory 2006, or the mass storage device 2016 may constitute machine-readable media.

While the machine-readable medium 2022 is illustrated as a single medium, the term "machine-readable medium" may include a single medium or multiple media (e.g., a centralized or distributed database and associated caches and servers) configured to store one or more instructions 2024.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 2024 for execution by the machine 2000 and that causes the machine 2000 to perform any one or more of the techniques of the present disclosure or that is capable of storing, encoding, or carrying data structures used by or associated with such instructions 2024. Non-limiting machine-readable medium examples may include solid-state memories and optical and magnetic media. For example, a massed machine-readable medium comprises a machine-readable medium 2022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 2024 may be transmitted or received over a communications network 2026 using a transmission medium via the network interface device 2020. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2024 for execution by the machine 2000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

generating training data with information about conversations comprising audio data for speech, timing of the speech, and contextual tags, the contextual tags comprising emotional states, user intent, and conversational context;

training a machine learning (ML) model using the training data to generate a companion model, the companion model configured to generate contextual tags based on an audio input and configured to generate a prompt for a large language model (LLM) that generates a response in a conversation;

providing a first audio input from a first conversation to the companion model, the companion model generating one or more first contextual tags associated with the first audio input;

generating, by the companion model that was trained with the training data comprising information about conversations with audio data for speech, timing of the speech, and the contextual tags, a prompt in natural language, the prompt comprising the first contextual tags and the first audio input in text form, the first contextual tags comprising one or more of emotional states, user intent, and conversational context for use in generating a contextually relevant response to the first audio input; and providing the prompt as input to the LLM that generates the contextually relevant response to the first audio input.

2. The method as recited in claim 1, wherein the prompt in natural language includes information about formality, tone, and vocabulary of the first conversation based on user preferences and conversational context.

3. The method as recited in claim 1, wherein the first contextual tags further comprise tone, intonation, pacing, and identification of pauses to identify user emotional states and conversational urgency.

4. The method as recited in claim 1, wherein the first contextual tags further comprise focal enhancers to emphasize critical concepts, affective markers to capture emotional states, deictic references to anchor prior conversational elements, task-oriented markup to define user requests, and cognitive demand indicators to specify a level of explanation or detail required.

5. The method as recited in claim 1, wherein generating the training data further comprises:

processing the audio data of the conversations to extract speech features, the speech features comprising intonation, pauses, pitch, and the timing of the speech.

6. The method as recited in claim 1, further comprising:

generating a memory pipeline to store a history of the first conversation comprising prior contextual tags of the first conversation to maintain continuity across multiple interactions in the first conversation.

7. The method as recited in claim 1, further comprising:

diarizing the audio data to separate individual speakers and assigning timestamps to utterances of each speaker.

8. The method as recited in claim 1, further comprising:

integrating multimodal sentiment analysis by combining audio features with text-based sentiment analysis to enhance an accuracy of the contextual tags.

9. The method as recited in claim 1, wherein the companion model is configured to detect and respond to paralinguistic signals, comprising hesitations, nervous laughter, or changes in speech rhythm, wherein the companion model is configured to generate task-specific contextual tags comprising one or more of user requests for clarification, emotional support, or domain-specific assistance.

10. A system comprising:

a memory comprising instructions; and one or more computer processors, the instructions, when executed by the one or more computer processors, causing the system to perform operations comprising:

generating training data with information about conversations comprising audio data for speech, timing of the speech, and contextual tags, the contextual tags comprising emotional states, user intent, and conversational context;

training a machine learning (ML) model using the training data to generate a companion model, the companion model configured to generate contextual tags based on an audio input and configured to generate a prompt for a large language model (LLM) that generates a response in a conversation;

providing a first audio input from a first conversation to the companion model, the companion model generating one or more first contextual tags associated with the first audio input;

generating, by the companion model that was trained with the training data comprising information about conversations with audio data for speech, timing of the speech, and the contextual tags, a prompt in natural language, the prompt comprising the first contextual tags and the first audio input in text form, the first contextual tags comprising one or more of emotional states, user intent, and conversational context for use in generating a contextually relevant response to the first audio input; and providing the prompt as input to the LLM that generates the contextually relevant response to the first audio input.

11. The system as recited in claim 10, wherein the prompt in natural language includes information about formality, tone, and vocabulary of the first conversation based on user preferences and conversational context.

12. The system as recited in claim 10, wherein the first contextual tags further comprise tone, intonation, pacing, and identification of pauses to identify user emotional states and conversational urgency.

13. The system as recited in claim 10, wherein the first contextual tags further comprise focal enhancers to emphasize critical concepts, affective markers to capture emotional states, deictic references to anchor prior conversational elements, task-oriented markup to define user requests, and cognitive demand indicators to specify a level of explanation or detail required.

14. A non-transitory machine-readable storage medium including instructions that, when executed by a machine, cause the machine to perform operations comprising:

generating training data with information about conversations comprising audio data for speech, timing of the speech, and contextual tags, the contextual tags comprising emotional states, user intent, and conversational context;

training a machine learning (ML) model using the training data to generate a companion model, the companion model configured to generate contextual tags based on an audio input and configured to generate a prompt for a large language model (LLM) that generates a response in a conversation;

providing a first audio input from a first conversation to the companion model, the companion model generating one or more first contextual tags associated with the first audio input;

generating, by the companion model that was trained with the training data comprising information about conversations with audio data for speech, timing of the speech, and the contextual tags, a prompt in natural language, the prompt comprising the first contextual tags and the first audio input in text form, the first contextual tags comprising one or more of emotional states, user intent, and conversational context for use in generating a contextually relevant response to the first audio input; and providing the prompt as input to the LLM that generates the contextually relevant response to the first audio input.

15. The non-transitory machine-readable storage medium as recited in claim 14, wherein the prompt in natural language includes information about formality, tone, and vocabulary of the first conversation based on user preferences and conversational context.

16. The non-transitory machine-readable storage medium as recited in claim 14, wherein the first contextual tags further comprise tone, intonation, pacing, and identification of pauses to identify user emotional states and conversational urgency.

17. The non-transitory machine-readable storage medium as recited in claim 14, wherein the first contextual tags further comprise focal enhancers to emphasize critical concepts, affective markers to capture emotional states, deictic references to anchor prior conversational elements, task-oriented markup to define user requests, and cognitive demand indicators to specify a level of explanation or detail required.

* * * * *